United States Patent
Aoki

(10) Patent No.: US 9,818,027 B2
(45) Date of Patent: Nov. 14, 2017

(54) IMAGE FORMING APPARATUS AND IMAGE FORMING SYSTEM

(71) Applicant: CANON KABUSHIKI KAISHA, Tokyo (JP)

(72) Inventor: Masaru Aoki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/057,504

(22) Filed: Mar. 1, 2016

(65) Prior Publication Data

US 2016/0259605 A1    Sep. 8, 2016

(30) Foreign Application Priority Data

Mar. 6, 2015   (JP) ................................. 2015-045087

(51) Int. Cl.
```
G06F 15/00      (2006.01)
G06K 9/00       (2006.01)
G06F 17/24      (2006.01)
G06K 17/00      (2006.01)
```
(52) U.S. Cl.
CPC ....... *G06K 9/00449* (2013.01); *G06F 17/243* (2013.01); *G06K 2017/0038* (2013.01); *G06K 2017/0041* (2013.01); *G06K 2209/01* (2013.01)

(58) Field of Classification Search
USPC ........................................................ 358/1.18
See application file for complete search history.

(56) References Cited

U.S. PATENT DOCUMENTS

| | | | |
|---|---|---|---|
| 2008/0144131 A1* | 6/2008 | Jung | G06K 9/2063 358/474 |
| 2010/0231996 A1* | 9/2010 | Ito | G06K 9/2063 358/530 |
| 2013/0011067 A1* | 1/2013 | Ben-Horesh | G06K 9/346 382/189 |
| 2015/0055151 A1 | 2/2015 | Inomata | |

FOREIGN PATENT DOCUMENTS

| | | |
|---|---|---|
| JP | 6-325058 A | 11/1994 |
| JP | 2010-252163 A | 11/2010 |
| JP | 2013-138370 A | 7/2013 |
| JP | 2014-112317 A | 6/2014 |
| JP | 2015-41992 A | 3/2015 |

\* cited by examiner

*Primary Examiner* — Saeid Ebrahimi Dehkord
(74) *Attorney, Agent, or Firm* — Fitzpatrick, Cella, Harper & Scinto

(57) ABSTRACT

An image forming apparatus forms only a required entry field on an application form, and, upon the application form in which this location has been filled in being scanned, further forms an additional entry field and prompts the applicant to fill in this entry field. An application form that has been completely filled in by the applicant is created by repeating this processing.

17 Claims, 29 Drawing Sheets

F I G. 10
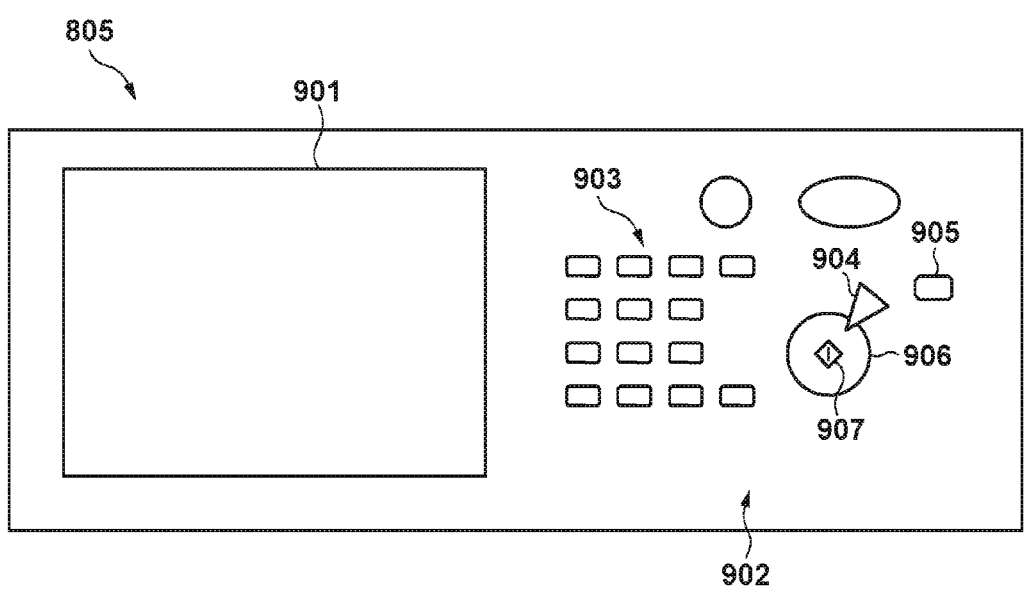

FIG. 15A

| No. | | TYPE | | DATE | | |
|---|---|---|---|---|---|---|
| NAME | WRITE IN KANA | A BANK | OTHER BANK | Y | M | D |

BANK TRANSFER REQUEST   AUTOMATIC PAYMENT APPLICATION
****************************************************************
***********************************************************

FIG. 15B

| 1501 | | 1502 | 1504 | | 1503 |

| | 1234567 | | TYPE | | | DATE |
|---|---|---|---|---|---|---|
| NAME | WRITE IN KANA かんのん たろう | | A BANK | ✓ | OTHER BANK | 2014Y 8M 18D |
| | 観音 太郎 | | | | | |

BANK TRANSFER REQUEST   AUTOMATIC PAYMENT APPLICATION
*************************************************************
********************************************************

F I G. 15C

| No. | 1234567 | TYPE | | | DATE | |
|---|---|---|---|---|---|---|
| NAME | WRITE IN KANA かんのん たろう | A BANK | レ | OTHER BANK | 2014Y 8M 18D | |
| | 観音 太郎 | | | | | |

BANK TRANSFER REQUEST   AUTOMATIC PAYMENT APPLICATION
************************************************************
********************************************************

| | WRITE IN KANA | SEAL |
|---|---|---|
| *** NAME | | |

| *** ACCOUNT | A BANK | *** CODE *** | *** CODE *** | SYMBOLS | | | | NUMERALS | | | | | |
|---|---|---|---|---|---|---|---|---|---|---|---|---|---|
| | | ***ACCOUNT No. | *****-*-***** | | ***NAME | | | *********** | | | | | |
| | | PAYMENT DATE | ********************** ********************** | | | | | ****** | | ****** | | | |

| No. | 1234567 | TYPE | | | DATE | |
|---|---|---|---|---|---|---|
| NAME | WRITE IN KANA かんのん たろう 観音 太郎 | A BANK | ✓ | OTHER BANK | 2014Y 8M 18D | |

BANK TRANSFER REQUEST   AUTOMATIC PAYMENT APPLICATION
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

| \*\*\* NAME | WRITE IN KANA かんのん たろう 観音 太郎 | SEAL |
|---|---|---|

| \*\*\* ACCOUNT | A BANK | \*\*\* CODE \*\*\* | \*\*\* CODE \*\*\* | SYMBOLS | 1 | 2 | 3 | 4 | 5 | 6 | NUMERALS | 1 | 2 | 3 | 4 | 5 | 6 | 7 | 8 |
|---|---|---|---|---|---|---|---|---|---|---|---|---|---|---|---|---|---|---|---|
| | | \*\*\*ACCOUNT No. | | | \*\*\*\*\*-\*-\*\*\*\*\* | | | | \*\*\*NAME | | \*\*\*\*\*\*\*\*\*\*\*\* | | | | | | | |
| | | PAYMENT DATE | | | \*\*\*\*\*\*\*\*\*\*\*\*\*\*\*\*\*\*\*\*\*\* \*\*\*\*\*\*\*\*\*\*\*\*\*\*\*\*\*\*\*\*\* | | | | | | \*\*\*\*\*\* | | \*\*\*\*\*\* | | | | | | |

1506

F I G. 15E

| No. | 1234567 | TYPE | | | DATE |
|---|---|---|---|---|---|
| NAME | WRITE IN KANA　かんのん　たろう<br>観音　太郎 | A BANK | ✓ | OTHER BANK | 2014Y 8M18D |

BANK TRANSFER REQUEST　AUTOMATIC PAYMENT APPLICATION

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

| \*\*\* NAME | WRITE IN KANA　かんのん　　たろう<br>観音　太郎 | SEAL<br>(観音) |
|---|---|---|

| \*\*\* ACCOUNT | A BANK | \*\*\* CODE<br>\*\*\* | \*\*\* CODE<br>\*\*\* | SYMBOLS | 1 | 2 | 3 | 4 | 5 | 6 | NUMERALS | 1 | 2 | 3 | 4 | 5 | 6 | 7 | 8 |
|---|---|---|---|---|---|---|---|---|---|---|---|---|---|---|---|---|---|---|---|
| | | \*\*\*ACCOUNT No. | \*\*\*\*\*-\*-\*\*\*\*\* | | | | \*\*\*NAME | | | | \*\*\*\*\*\*\*\*\*\*\* | | | | | | | | |
| | | PAYMENT DATE | \*\*\*\*\*\*\*\*\*\*\*\*\*\*\*\*\*\*\*\*\*\*<br>\*\*\*\*\*\*\*\*\*\*\*\*\*\*\*\*\*\*\*\*\* | | | | | | | | \*\*\*\*\*\* | \*\*\*\*\*\* | | | | | | | |

| \*\*\*\*\*\*\*\*\*\*\*\*\* | \*\*\*\*\*\*\*\*\*\*\*\*\*\*\*\*\*\*\*\*\*\* | \*\*\*\*\*\*<br>\*\*\* | \*\*\* |
|---|---|---|---|

BANK TRANSFER REGULATIONS

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*\*\*\*\*\*\*

~1507

| | \*\*\*\*\*\*\*\*\*\*\*\*<br>\*\*\*\*\*\*\*\*\*\*\*\*\* | \*\*\*\*\*\*\*\* | DATE STAMP |
|---|---|---|---|
| \*\*\*\*\*\*\*\*\* | \*\*\*\*\*\*\*\*\*\*\*\*\*\*\*\*\*\*\*\*\*<br>\*\*\*\*\*\*\*\*\*<br>\*\*\*\*\*\*\*<br>\*\*\*\*\*\*\*\*\*<br>\*\*\*\*\*\*\*\*\* | OFFICIAL SEAL | ○ |
| | | SEAL VERIFICATION | |
| | | RECEPTION STAMP | |

FIG. 15F

| No. | 1234567 | | TYPE | | | DATE | |
|---|---|---|---|---|---|---|---|
| NAME | WRITE IN KANA かんのん たろう 観音 太郎 | | A BANK | ✓ | OTHER BANK | 2014Y 8M 18D | |

BANK TRANSFER REQUEST  AUTOMATIC PAYMENT APPLICATION

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

| \*\*\* NAME | WRITE IN KANA | SEAL |
|---|---|---|
| | | |

| \*\*\* ACCOUNT | FINANCIAL INSTITUTION OTHER THAN A BANK | \*\*\* CODE | BRANCH CODE | \*\*\* TYPE | BANK NON-BANK CREDIT UNION 1.SAVINGS 2.CHECKING | ACCOUNT No. | CENTRAL BRANCH LOCAL BRANCH |
|---|---|---|---|---|---|---|---|
| | | \*\*\*\*\*\* | \*\*\*\*\*-\*-\*\*\*\*\* | \*\*\*\*\*\* | | \*\*\*\*\*\*\*\*\*\*\*\*\*\*\* | |
| | | \*\*\*\* | | | \*\*\*\*\*\*\*\*\*\*\*\*\*\*\*\*\*\*\*\*\*\* | | |

| No. | 1234567 | TYPE | | DATE |
|---|---|---|---|---|
| NAME | WRITE IN KANA かんのん たろう 観音 太郎 | A BANK | ✓ OTHER BANK | 2014Y 8M 18D |

BANK TRANSFER REQUEST   AUTOMATIC PAYMENT APPLICATION
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\* NAME: WRITE IN KANA かんのん たろう  観音 太郎   SEAL

\*\*\* ACCOUNT | FINANCIAL INSTITUTION OTHER THAN A BANK | 日本＊＊ BANK NON-BANK CREDIT UNION | 下丸子 CENTRAL BRANCH LOCAL BRANCH

\*\*\* CODE 1234 | BRANCH CODE 567 | \*\*\* TYPE 1.SAVINGS 2.CHECKING | ACCOUNT No. 1234567

| No. | 1234567 |
| --- | --- |
| NAME | WRITE IN KANA たろう 太郎 |

| TYPE | | |
| --- | --- | --- |
| A BANK | ν | OTHER BANK |

| DATE |
| --- |
| 2014 Y 8 M 18 D |

BANK TRANSFER REQUEST  AUTOMATIC PAYMENT APPLICATION
*********************************
*********************************

DATE  Y  M  D

| WRITE IN KANA | | | |
| --- | --- | --- | --- |
| NAME | | | |
| DATE OF BIRTH | * * Y * * M | * * D | SEX  M  F |
| WRITE IN KANA | | | |
| ****ADDRESS | 〒 * * * * | | |
| TEL | | CELL | |
| FAX | | E-mail | |
| WRITE IN KANA WORKPLACE | | | |
| WRITE IN KANA | | | |
| ****ADDRESS | 〒 * * * * | | |
| TEL | | E-mail | |

1604

○○○○ MEMBERSHIP APPLICATION
*********************************
*********************************

DATE  Y  M  D

| WRITE IN KANA | | | |
| --- | --- | --- | --- |
| NAME | | | |
| DATE OF BIRTH | * * Y * * M | * * D | SEX  M  F |
| WRITE IN KANA | | | |
| ****ADDRESS | 〒 * * * * | | |
| TEL | | CELL | |
| FAX | | E-mail | |
| WRITE IN KANA WORKPLACE | | | |
| WRITE IN KANA | | | |
| ****ADDRESS | 〒 * * * * | | |
| TEL | | E-mail | |

F I G. 18A

| No. 1234567 | TYPE | | DATE |
|---|---|---|---|
| NAME WRITE IN KANA かんのん たろう 観音 太郎 | A BANK | ✓ OTHER BANK | 2014Y 8M 18D |

BANK TRANSFER REQUEST   AUTOMATIC PAYMENT APPLICATION
****************************************************************
*********************************************************

| *** NAME | WRITE IN KANA | SEAL |
|---|---|---|
| | | |

| *** ACCOUNT | FINANCIAL INSTITUTION OTHER THAN A BANK | BANK NON-BANK CREDIT UNION | | CENTRAL BRANCH LOCAL BRANCH |
|---|---|---|---|---|
| | | | *** TYPE  1.SAVINGS 2.CHECKING  ACCOUNT No. | |
| | | ***** | ****-*-***** ***** | ************** |
| | | **** | ********************** | |

| No. | 1234567 | TYPE | | | DATE | |
|---|---|---|---|---|---|---|
| NAME | WRITE IN KANA かんのん たろう | A BANK | ✓ | OTHER BANK | 2014Y 8M 18D | |
| | 観音 太郎 | | | | | |

BANK TRANSFER REQUEST   AUTOMATIC PAYMENT APPLICATION

**************************************************************
**********************************************************

| *** NAME | WRITE IN KANA かんのん たろう | | | SEAL |
|---|---|---|---|---|
| | 観音 太郎 | | | |

| *** ACCOUNT | FINANCIAL INSTITUTION OTHER THAN A BANK | 日本※※ | BANK NON-BANK CREDIT UNION | 下丸子 | CENTRAL BRANCH LOCAL BRANCH |
|---|---|---|---|---|---|
| | | *** TYPE | 1.SAVINGS 2.CHECKING | ACCOUNT No. | 1 2 3 4 5 6 7 |
| | ****** | *****-*-***** | ****** | *************** | |
| | **** | ************************ | | | |

| No. | 1234567 | | TYPE | | | DATE |
|---|---|---|---|---|---|---|
| NAME | WRITE IN KANA かんのん たろう | | A BANK | レ | OTHER BANK | 2014Y 8M 18D |
| | 観音 太郎 | | | | | |

BANK TRANSFER REQUEST   AUTOMATIC PAYMENT APPLICATION

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

| \*\*\* NAME | WRITE IN KANA かんのん たろう | SEAL |
|---|---|---|
| | 観音 太郎 | |

| \*\*\* ACCOUNT | 1804 FINANCIAL INSTITUTION OTHER THAN A BANK | 日本＊＊ | BANK NON-BANK CREDIT UNION | 下丸子 | CENTRAL BRANCH LOCAL BRANCH |
|---|---|---|---|---|---|
| | | \*\*\* CODE 1234 | BRANCH CODE 567 | \*\*\* TYPE (1.SAVINGS) 2.CHECKING | ACCOUNT No. 1234567 |

\*\*\*\*\*\*   \*\*\*\*\*-\*-\*\*\*\*\*   \*\*\*\*\*\*   \*\*\*\*\*\*\*\*\*\*\*\*\*\*
\*\*\*\*   \*\*\*\*\*\*\*\*\*\*\*\*\*\*\*\*\*\*\*\*\*\*\*\*

\*\*\*\*\*\*\*\*\*\*\*\*   \*\*\*\*\*\*\*\*\*\*\*\*\*\*\*\*\*\*\*\*   \*\*\*\*\*\* \*\*\*   \*\*\*

BANK TRANSFER REGULATIONS

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*

| | \*\*\*\*\*\*\*\* | |
|---|---|---|
| \*\*\*\*\*\*\*\* \*\*\*\*\*\*\*\*\*\*\* \*\*\*\*\*\*\*\*\*\*\* \*\*\*\*\*\*\*\*\*\*\*\*\*\*\*\*\*\*\*\* \*\*\*\*\*\*\*\*\* \*\*\*\*\*\*\* \*\*\*\*\*\*\*\*\* \*\*\*\*\*\*\*\* | OFFICIAL SEAL | DATE STAMP |
| | SEAL VERIFICATION | |
| | RECEPTION STAMP | |

IMAGE FORMING APPARATUS AND IMAGE FORMING SYSTEM

BACKGROUND OF THE INVENTION

Field of the Invention

The present invention relates to an image forming apparatus provided with an automatic document feeder (ADF), such as a copier or a laser beam printer, and to an image forming system.

Description of the Related Art

There are application forms such as automatic payment forms, for example, in which the sections for filling in required information differ depending on the financial institution. The person filling in the form selects desired fields from a plurality of entry fields and fills in these fields with the required information. With respect to configurations that require filling in such as the above, Japanese Patent Laid-Open No. 06-325058 proposes an application acceptance processing apparatus that uses a pen-input computer to make it easier for the person filling in the form.

However, there is the following problem with the above conventional technology. The above conventional technology enables information to be efficiently input using a pen-input method via a computer. However, required information could possibly be written into the wrong entry field, and usability could be reduced.

SUMMARY OF THE INVENTION

The present invention enables realization of suppressing the writing of required information into the wrong entry field.

One aspect of the present invention provides an image forming apparatus comprising: a reading unit configured to read an original on which a first image is formed; a specification unit configured to specify information relating to the first image formed on the original, based on a reading result read by the reading unit; a determination unit configured to determine a second image, based on the information relating to the first image specified by the specification unit; and an image forming unit configured to form the second image determined by the determination unit on the original.

Another aspect of the present invention provides an image forming apparatus comprising: a reading unit configured to read an original on which a first image is formed; and an image forming unit configured to form an image on the original, wherein information relating to the first image formed on the original is specified based on a reading result read by the reading unit, and a second image is determined based on the information relating to the first image, and the image forming unit forms the second image on the original.

Still another aspect of the present invention provides an image forming system including an image forming apparatus that performs image formation, comprising: a reading unit configured to read an original on which a first image is formed; a specification unit configured to specify information relating to the first image formed on the original, based on a reading result read by the reading unit; a determination unit configured to determine a second image, based on the information relating to the first image specified by the specification unit; and an image forming unit configured to form the second image determined by the determination unit on the original.

Further features of the present invention will be apparent from the following description of exemplary embodiments with reference to the attached drawings.

BRIEF DESCRIPTION OF THE DRAWINGS

FIG. 10 is a diagram showing an operation unit according to one embodiment.

FIGS. 15A to 15H are diagrams showing a bank transfer request form according to one embodiment.

FIGS. 16A and 16B are diagrams illustrating template matching according to one embodiment.

FIG. 17 is a diagram showing a two-dimensional barcode according to one embodiment.

FIGS. 18A to 18C are diagrams showing a bank transfer request form according to one embodiment.

FIG. 19 is a diagram illustrating character recognition area clippings according to one embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Image Forming Apparatus

Figure 1:
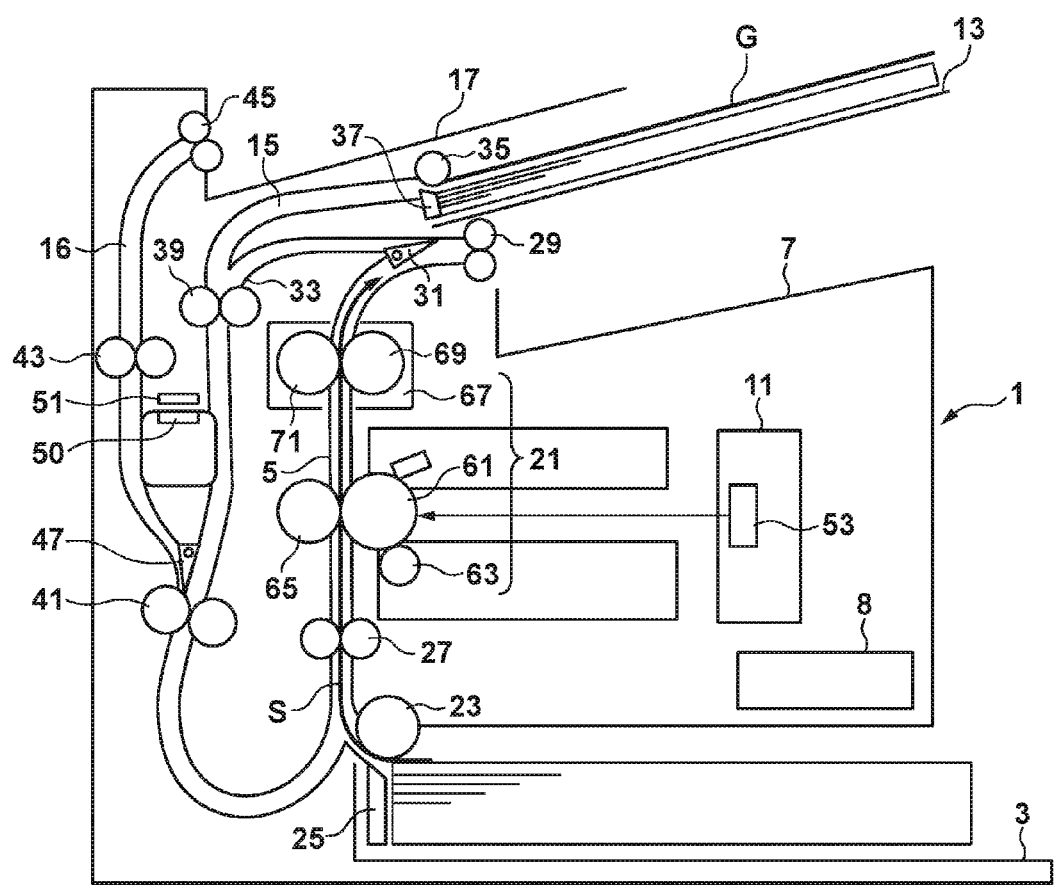
FIG. 1 is a diagram showing an image forming apparatus according to one embodiment.
Figure 2:
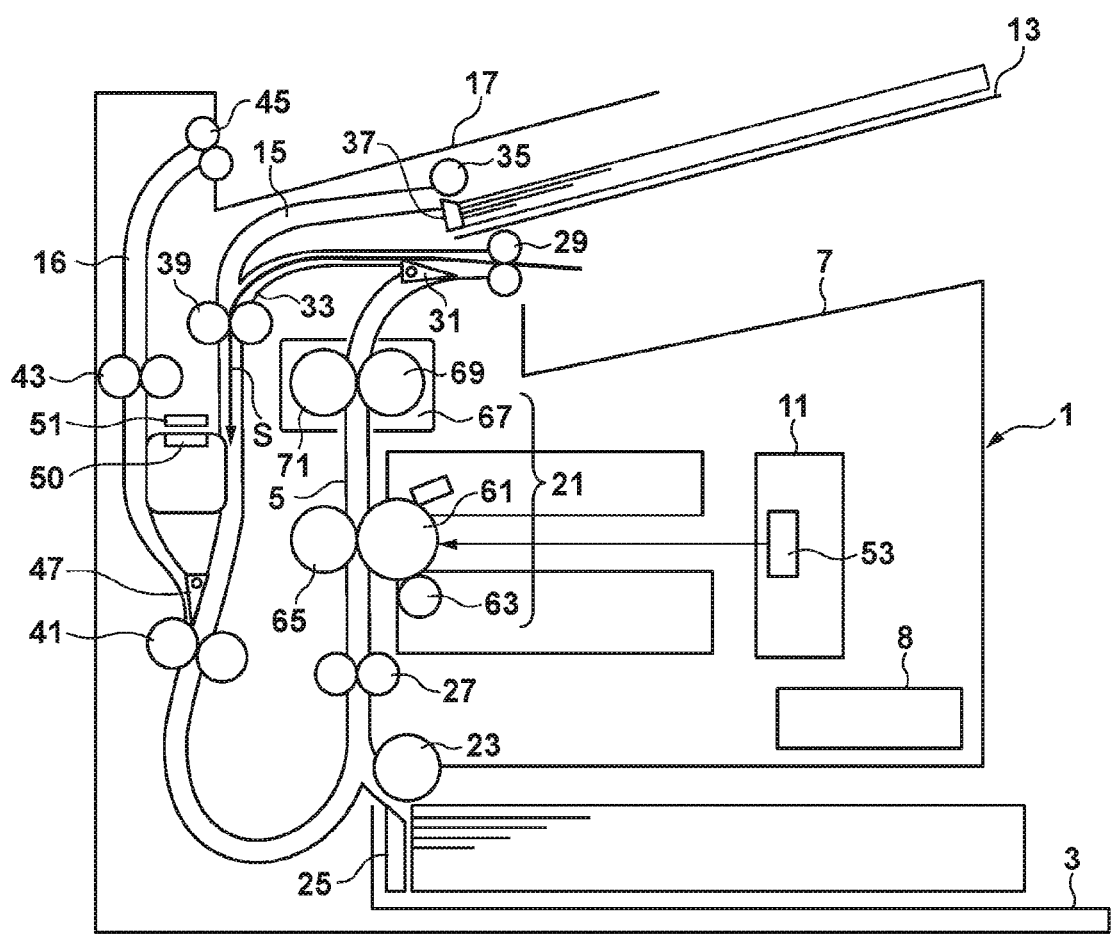
FIG. 2 is a diagram for illustrating a process of double-sided printing according to one embodiment.

Hereinafter, a first embodiment of the present invention will be described. First, a configuration of an image forming apparatus 1 of the present embodiment will be described, with reference to FIG. 1. FIG. 1 shows a cross-section of the image forming apparatus 1.

Figure 9:
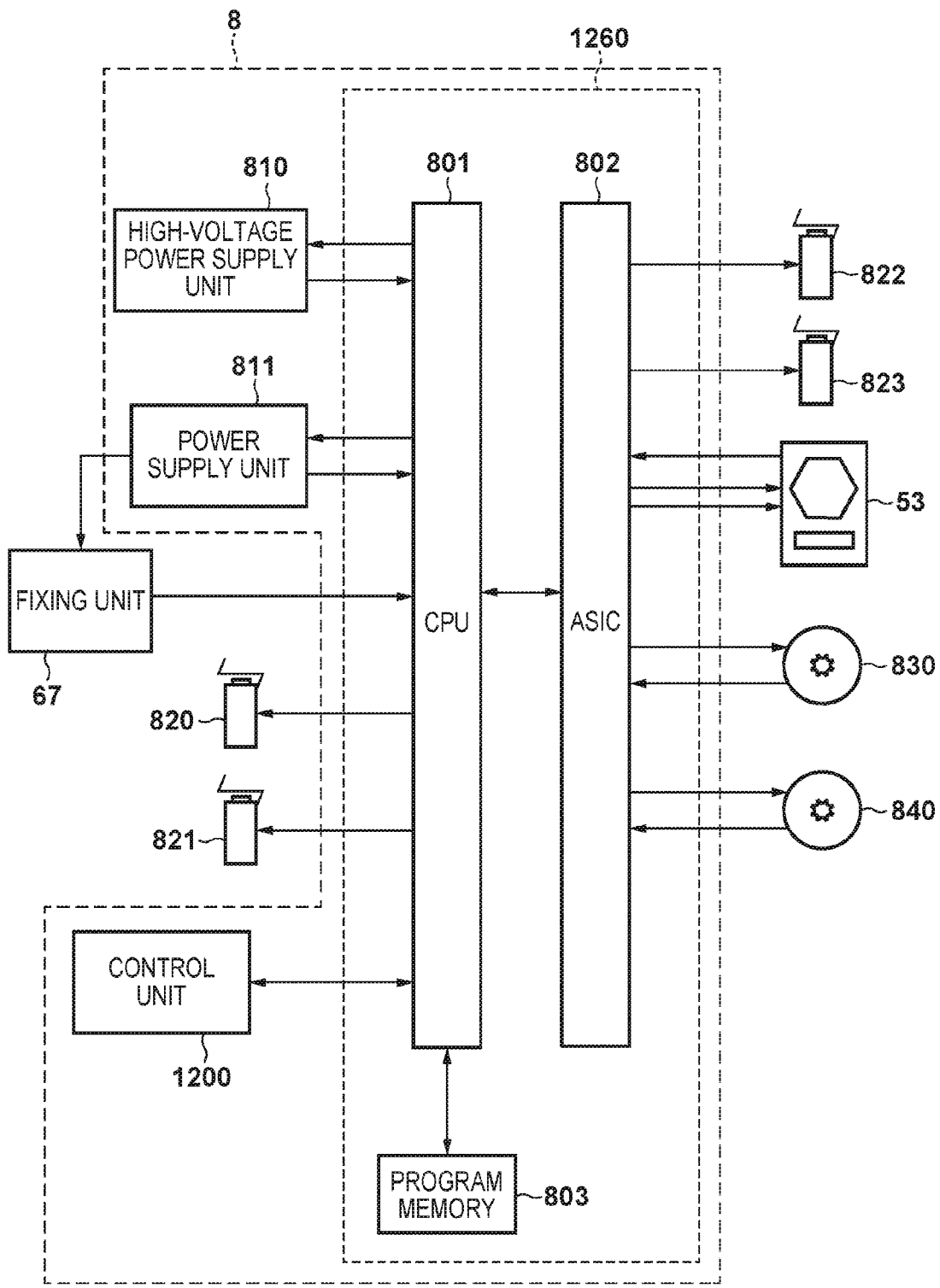
FIG. 9 is a diagram showing an internal configuration of a printer control unit of an image forming apparatus according to one embodiment.

The image forming apparatus 1 is provided with a first sheet feeding unit 3 that houses recording material S such as printing paper, transfer paper or OHP sheets, a first conveyance path (hereinafter, recording material conveyance path) 5 that conveys the recording material S from the first sheet feeding unit 3, a first sheet discharging unit 7 that stacks the conveyed recording material S, an electrical component 8, and an optical unit 11. The electrical component 8 will be discussed in detail later using FIGS. 9 and 12. Also, the image forming apparatus 1 is provided with a second sheet feeding unit 13 that houses an original G containing image information, a second conveyance path (hereinafter, original conveyance path) 15 that conveys the original G from the second sheet feeding unit 13, a third conveyance path (hereinafter, original conveyance path) 16, and a second sheet discharging unit 17 that discharges the conveyed original G.

The recording material conveyance path 5 is provided with a printing unit 21 that prints an image on the recording material S, a CST (cassette tray) pickup roller 23 that conveys the recording material S, a separating unit 25, conveyance rollers 27, sheet discharging rollers 29, and a double-sided flapper 31 for double-sided printing. The original conveyance path 15 is provided with an inversion conveyance path 33 that conveys the original G or the recording material S after inverting the original G or the recording material S front to back, a CIS (Contact Image Sensor) pickup roller 35 that conveys the original G, a separating unit 37, and conveyance rollers 39 and 41. The original conveyance path 16 is provided with conveyance rollers 43, sheet discharging rollers 45, and a switchback flapper 47. The original conveyance path 16 is connected to the inversion conveyance path 33 at the position of the switchback flapper 47. The inversion conveyance path 33 is connected at respective ends to the recording material conveyance path 5 at the positions of the conveyance rollers 27 and the sheet discharging rollers 29. An image reading unit 50 and a white reference member 51 opposing the image reading unit 50 are provided between the inversion conveyance path 33 and the original conveyance path 16. In the present embodiment, the following description will be given based on the recording material conveyance path 5, the CST pickup roller 23, the separating unit 25, the conveyance rollers 27, the sheet discharging rollers 29, the double-sided flapper 31, the CIS pickup roller 35, the separating unit 37, the conveyance rollers 39 and 41, the conveyance rollers 43, the sheet discharging rollers 45, and the switchback flapper 47 as an example of a conveyance unit.

Also, in the present embodiment, the following description will be given based on the image reading unit 50 as an example of a reading unit. The optical unit 11 is provided with a light emitting unit 53 that receives a print signal from a printer control unit 1260 shown in FIG. 12 which will be discussed later and irradiates the printing unit 21 with laser light. In the image forming apparatus 1 according to the present embodiment, the optical unit 11 and the printing unit 21 constitute an example of an image forming unit.

Also, in the present embodiment, the following description will be given based on the printing unit 21 as an example of a printing unit. The printing unit 21 is constituted by a photosensitive drum 61, a developing roller 63, a transfer unit 65, and a fixing unit 67. The fixing unit 67 is constituted by a heating roller 69 and a pressure roller 71. The photosensitive drum 61 is a rotatable image carrier. The developing roller 63 is in parallel contact with the photosensitive drum 61, and rotates while holding toner. When the optical unit 11 receives a print signal, the light emitting unit 53 irradiates the surface of the rotating photosensitive drum 61 with laser light. An electrostatic latent image generated by electric charge is formed on the surface of the photosensitive drum 61 irradiated with the laser light. A toner image is formed on the surface of the photosensitive drum 61 when toner is supplied to the electrostatic latent image formed on the surface of the photosensitive drum 61 while the developing roller 63 is rotating. The transfer unit 65 that transfers the toner image to the recording material S is in parallel contact with the photosensitive drum 61.

The recording material S housed in the first sheet feeding unit 3 is conveyed one sheet at a time to the conveyance rollers 27 of the recording material conveyance path 5 by the CST pickup roller 23 and the separating unit 25. In FIG. 1, the thick line arrow indicates the recording material S and the direction in which the recording material S moves. Note that the same also applied to FIGS. 2 to 8. The conveyance rollers 27 convey the recording material S to the transfer unit 65 while adjusting the timing such that the leading edge of the recording material S and the toner image on the surface of the photosensitive drum 61 are aligned.

The toner image is conveyed to the transfer unit 65 by the rotation of the photosensitive drum 61, and is transferred to the recording material S by the application bias and pressure that are imparted to the transfer unit 65. The recording material S to which the toner image has been transferred by the transfer unit 65 is then conveyed to the fixing unit 67. In the fixing unit 67, the toner image is fixed to the recording material S by heat from the rotatable heating roller 69 and pressure applied by the pressure roller 71. The recording material S to which the toner image has been fixed is conveyed by the sheet discharging rollers 29. In the case of single-sided printing, the sheet discharging rollers 29 discharge the recording material S to the first sheet discharging unit 7. On the other hand, in the case of double-sided printing, the sheet discharging rollers 29 convey the recording material S to the inversion conveyance path 33 that is connected to the recording material conveyance path 5.

Electrical Component

Next, the configuration of the electrical component 8 according to the present embodiment will be described in detail. The electrical component 8 is constituted by two control units, namely, a control unit 1200 and the printer control unit 1260 that are connected to each other. Here, the internal configuration of the printer control unit 1260 in the image forming apparatus 1 of the present embodiment will be described in detail, with reference to FIG. 9. Units that are controlled by a control CPU 801, which is an example of a control unit, are provided inside the printer control unit 1260.

The control CPU 801 is connected to the light emitting unit 53, which includes a polygon mirror, a motor and a laser emitting element, via an ASIC (Application Specific Integrated Circuit) 802. The ASIC 802 is used in order to achieve a reduction in the control load of the control CPU 801. The control CPU 801 transmits a control signal to the ASIC 802 to control the light emitting unit 53, in order to scan the surface of the photosensitive drum 61 with laser light and form a desired electrostatic latent image.

The control CPU 801 is connected to a program memory 803 via a bus or the like. The program memory 803 stores programs and data for executing all or part of the processing that is performed by the control CPU 801. That is, the control CPU 801 executes processing that is described below using programs and data stored in the program memory 803. The control CPU 801 further controls a high-voltage power supply unit 810 that controls charging, development, transfer, and the like required in the electrophotographic process, and a power supply unit 811 that controls fixing. Also, the control CPU 801 monitors the temperature using a thermistor provided in the fixing unit 67, and performs control for maintaining a constant fixing temperature.

The control CPU 801 controls a drive system consisting of a double-sided flapper solenoid 820, a switchback solenoid 821, and the like. Also, in order to convey the recording material S, the control CPU 801 transmits a control signal to the ASIC 802 to control a drive system consisting of a CST sheet feeding solenoid 822, a CIS sheet feeding solenoid 823, a main motor 830, a double-sided drive motor 840, and the like. The main motor 830 drives the CST pickup roller 23, the conveyance rollers 27, the photosensitive drum 61, the transfer unit 65, the heating roller 69, the pressure roller 71, and the like. The CST sheet feeding solenoid 822 is turned ON when driving of a sheet feeding roller that feeds the recording material S is started, and drives the CST pickup roller 23. The double-sided drive motor 840 drives the CIS pickup roller 35, the conveyance rollers 39, 41 and 43, and the sheet discharging rollers 45.

The ASIC 802 controls the speed of the motor inside the light emitting unit 53, the speed of the main motor 830, and the speed of the double-sided drive motor 840 based on instructions from the control CPU 801. Such speed control of the motors involves detecting tach signals from each of the above-mentioned motors, and transmitting an acceleration signal or a deceleration signal to the motors such that the interval between tach signals is a predetermined time period. A tach signal is a pulse signal that is output from a motor every revolution of the motor.

Figure 12:
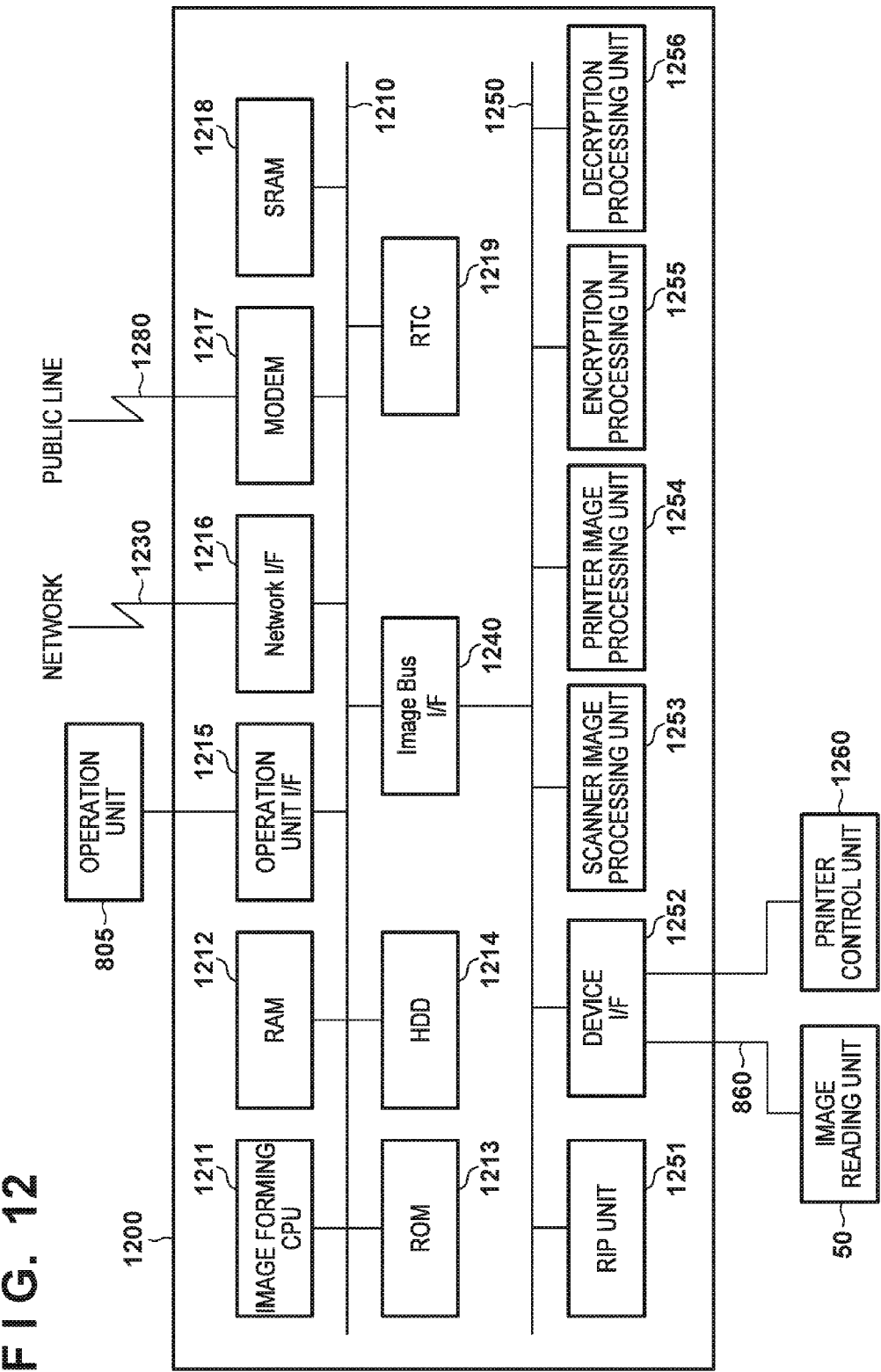
FIG. 12 is a diagram showing an example of a hardware configuration of an image forming apparatus according to one embodiment.

As shown in FIG. 12, the printer control unit 1260 is connected to the control unit 1200. An image forming CPU 1211 that is included in the control unit 1200 performs processing such as controlling an operation unit 805 to display operation screens, and receiving commands from a user via the operation unit 805. Further, the image forming CPU 1211 notifies commands received via the operation unit 805 and commands received from a host computer to the printer control unit 1260.

The control CPU 801 drives the main motor 830 and the double-sided drive motor 840 to convey the recording material S, in the case where a copy command is received from the image forming CPU 1211 or in the case where a print command is received from the host computer through the image forming CPU 1211. The toner image formed on the surface of the photosensitive drum 61 is transferred to the recording material S by the transfer unit 65, and is fixed to the recording material S by the fixing unit 67. Then, the recording material S is discharged to the first sheet discharging unit 7. In order to enhance the alignment of the sheets of the recording material S that have undergone image forming, the first sheet discharging unit 7 is provided with a slight upward gradient in the discharge direction of the recording material S from near the sheet discharge port. The control CPU 801 controls the power supply unit 811 to supply a predetermined amount of power to the fixing unit 67. The fixing unit 67 generates a predetermined amount of heat and applies that heat to the recording material S to fuse the toner image that is on the recording material S and fix the toner image to the recording material S.

The control CPU 801 drives the double-sided drive motor 840, in the case where a copy command is received from the image forming CPU 1211 or in the case where a scan command is received from the host computer through the image forming CPU 1211. The torque of the double-sided drive motor 840 is transmitted to the CIS pickup roller 35, and the CIS pickup roller 35 conveys the original G. The image reading unit 50 is connected to a device I/F 1252 which will be discussed later via a signal line 860.

Operation Unit

Next, an exemplary configuration of the operation unit 805 according to the present embodiment will be described, with reference to FIG. 10. The operation unit 805 is provided with a display unit 901 and a keyboard 902. The keyboard 902 is provided with a numeric keypad 903, a stop key 904, a user mode key 905, and a start key 906.

The display unit 901 is constituted by a liquid crystal display to which a touch-panel sheet is adhered, and displays operation screens and soft keys. When a soft key is pressed, the display unit 901 transmits position information indicating the position that was pressed to an operation unit I/F 1215. The operation unit I/F 1215 discriminates the user command, based on this position information.

The numeric keypad 903 consists of keys for inputting numbers and characters, and is used for setting the number of copies or switching screens. The stop key 904 is a key for stopping an operation that is being performed. The user mode key 905 is a key for configuring settings of the image forming apparatus 1. The start key 906 is a key for instructing the start of reading of image information and the start of printing. A two-color LED 907 is provided in the middle of the start key 906. For example, when the LED 907 is green, this shows that the start key 906 can be used, and when the LED 907 is red, this shows that the start key 906 cannot be used.

Image Reading Unit

Figure 11:
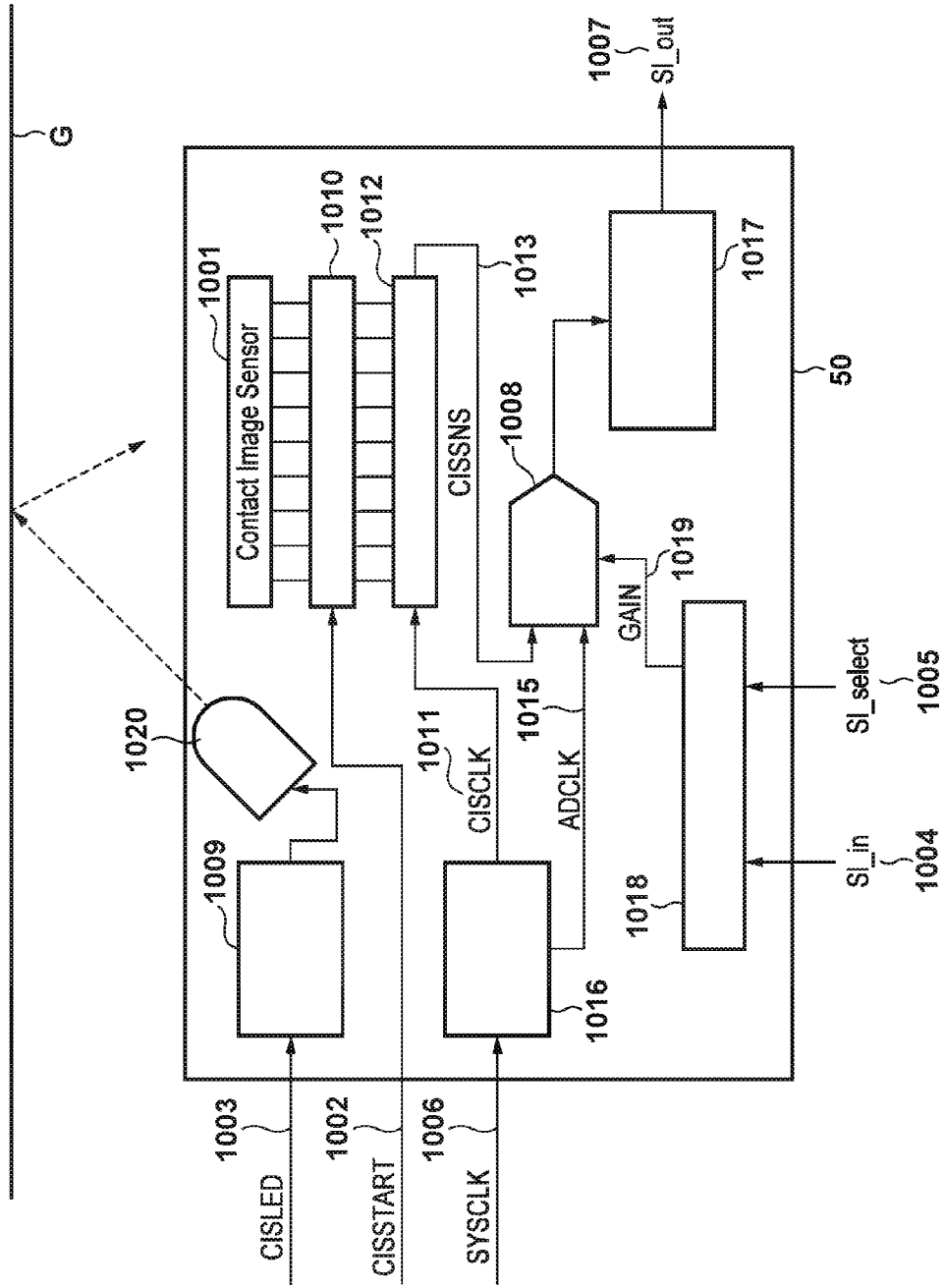
FIG. 11 is a diagram illustrating a configuration of an image reading unit according to one embodiment.

Next, an exemplary configuration of the image reading unit 50 that is provided in the image forming apparatus 1 according to the present embodiment will be described, with reference to FIG. 11. FIG. 11 shows a circuit block of a CIS (Contact Image Sensor) 1001. In the CIS 1001, photodiodes for 10,368 pixels, for example, are disposed in an array at a specific main scanning density (e.g., 1,200 dpi).

The image reading unit 50 receives a start pulse (CISSTART) signal 1002, a light emitting element control (CISLED) signal 1003, and an sl_in signal 1004 from the device I/F 1252 shown in FIG. 12. Further, the image reading unit 50 receives an sl_select signal 1005 and a system clock (SYSCLK) signal 1006 that determines the operating speed of the CIS from the device I/F 1252. Note that the CISSTART signal 1002, the CISLED signal 1003, the sl_in signal 1004, the sl_select signal 1005 and the SYSCLK signal 1006 are transmitted using the signal line 860 connecting the device I/F 1252 to the image reading unit 50 shown in FIG. 12.

Also, the image reading unit 50 transmits an sl_out signal 1007 to the device I/F 1252. The sl_out signal 1007 is transmitted using the signal line 860 connecting the device I/F 1252 to the image reading unit 50 shown in FIG. 12.

A light emitting element 1020 emits light based on current amplified by a current amplification unit 1009, and uniformly irradiates the original G. When the CISSTART signal 1002 becomes active, the CIS 1001 starts accumulating charge that is based on received light, and sequentially sets data in an output buffer 1010. When a transfer clock (CISCLK) signal 1011 is provided to a shift register 1012, the shift register 1012 transfers the data that is set in the output buffer 1010 to an A/D converter 1008 as a CISSNS signal 1013. The frequency of the CISCLK signal 1011 is 500 kHz to 1 MHz, for example.

Since there is a predetermined data security area in the CISSNS signal 1013, the CISSNS signal 1013 is sampled after a predetermined time period has elapsed from the rise timing of the CISCLK signal 1011. The CISSNS signal 1013 is output in synchronization with both the rising and falling edges of the CISCLK signal 1011. The frequency of a CIS sampling clock (ADCLK) signal 1015 that determines the sampling speed of the A/D converter 1008 is generated so as to be twice the frequency of the CISCLK signal 1011. The CISSNS signal 1013 is then sampled using the rising edge of the ADCLK signal 1015. A timing generator 1016 frequency divides the SYSCLK signal 1006 to generate the ADCLK signal 1015 and the CISCLK signal 1011. The phase of the ADCLK signal 1015 is delayed by an amount corresponding to the data security area, compared with the CISCLK signal 1011.

The CISSNS signal 1013 converted to digital data by the A/D converter 1008 is transmitted as the sl_out signal 1007 by an output interface circuit 1017 at a predetermined timing. The sl_out signal 1007 is serial data. Since the CISSNS signals 1013 for a predetermined number of pixels from the CISSTART signal 1002 are analog output reference voltages, these pixels are not used as effective pixels.

A control circuit 1018 is able to variably control an A/D conversion gain of the A/D converter 1008 via a GAIN 1019 in accordance with the sl_in signal 1004 and the sl_select signal 1005. For example, in the case where the contrast of a captured image is not appropriately obtained, the control circuit 1018 is instructed to increase the A/D conversion gain of the A/D converter 1008, thereby increasing contrast. An image can thereby be captured with ideal contrast.

FIG. 11 illustrates an example in which all of the pixels are output one at a time as CISSNS signals 1013. However, in order to read an image at high speed, a plurality of pixels may be divided by area, and A/D conversion may be performed on a plurality of areas in parallel. Also, in FIG. 11, the CIS 1001 is illustrated as an example of an image sensor for image reading. However, the present invention is not limited thereto, and a CMOS sensor or a CCD sensor, for example, can also be applied.

Operation Controls

Next, an operation of printing to the recording material S, an operation of reading the original G, and a additional printing operation in the image forming apparatus 1 will be described, with reference to FIGS. 2 to 8. First, operation control of double-sided printing in the present embodiment will be described, with reference to FIG. 2.

The recording material S that is housed in the first sheet feeding unit 3 is picked up by the CST pickup roller 23 and conveyed by the conveyance rollers 27. Next, the recording material S passes the transfer unit 65 and has a toner image fixed to one side thereof, and is further conveyed by the sheet discharging rollers 29. Then, after the trailing edge of the recording material S has passed the double-sided flapper 31, the double-sided flapper 31 switches the conveyance path from the recording material conveyance path 5 to the inversion conveyance path 33. Then, the sheet discharging rollers 29 start reverse rotation and the recording material S is conveyed to the inversion conveyance path 33. The recording material S is conveyed to the image reading unit 50 by the conveyance rollers 39. Then, the recording material S is again conveyed to the transfer unit 65 by the conveyance rollers 41 and the conveyance rollers 27. The recording material S is discharged to the first sheet discharging unit 7 after having a toner image transferred and fixed to the back side thereof.

Next, operation control of double-sided copying in the present embodiment will be described, with reference to FIGS. 3 to 7. Note that although, in the present embodiment, the first side of the original G is assumed to be the front side and the second side is assumed to be the back side, the first side may be taken as the back side and the second side may be taken as the front side, and which of the first side or the second side of the original G is the front side is not important.

Figure 3:
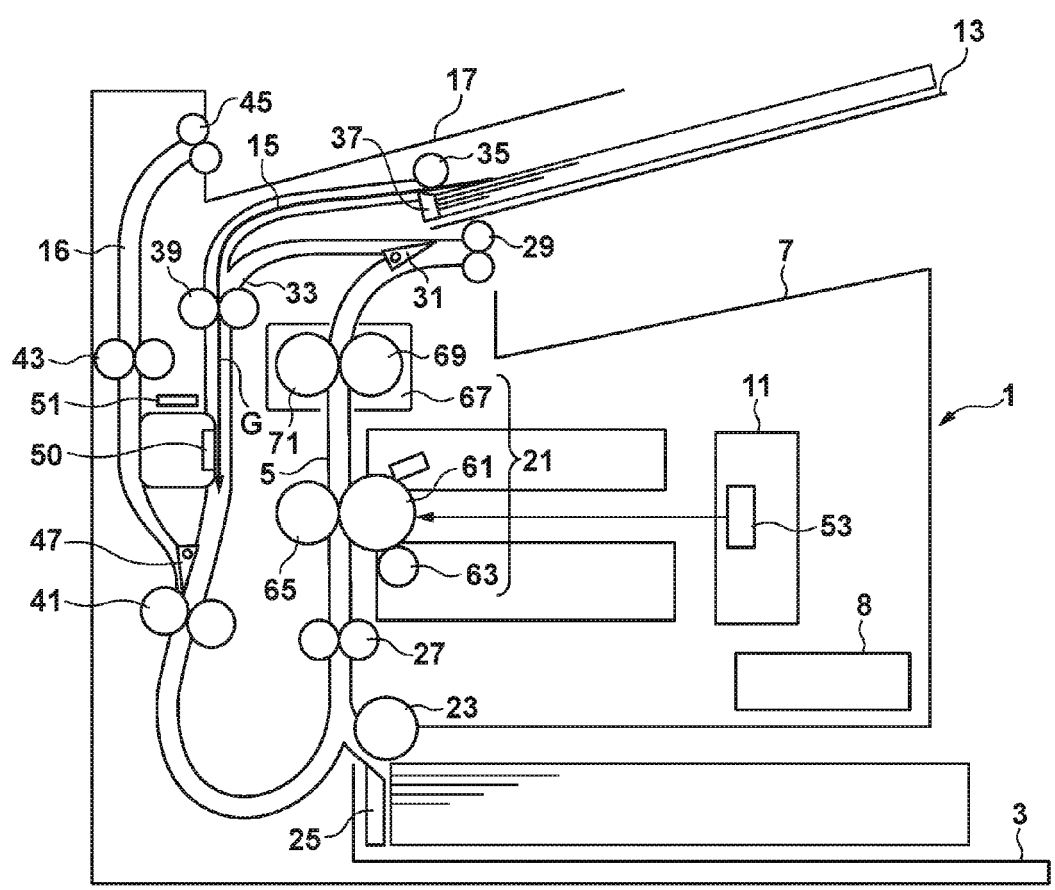
FIG. 3 is a diagram for illustrating an operation in which reading of image information of a first side of an original is started according to one embodiment.

FIG. 3 shows the original G being conveyed from the second sheet feeding unit 13 to the original conveyance path 15, and reading of the image information of the first side of the original G being started. In FIG. 3, the thick line arrow shows the original G and the direction in which the original G moves.

The original G that is housed in the second sheet feeding unit 13 is conveyed one sheet at a time to the conveyance rollers 39 by the CIS pickup roller 35 and the separating unit 37. The image reading unit 50 corrects for variation in the output level of the image signals that originates in factors such as sensitivity non-uniformity of the CIS (Contact Image Sensor) 1001 and non-uniformity of the light emitting element 1020 that are provided in the image reading unit 50, before starting to read the first side of the original G. Specifically, the image reading unit 50 derives a shading correction coefficient for performing the correction (shading correction). The shading correction removes density unevenness from an image that has uneven density (luminance) and enables an image with uniform brightness to be obtained. The shading correction coefficient is derived from a white reference image and a black reference image, at the position where the image reading unit 50 opposes the white reference member 51. Here, the white reference image is read by the image reading unit 50 in a state where the light emitting element 1020 has emitted light onto the white reference member 51, whereas the black reference image is read by the image reading unit 50 in a state where the light emitting element 1020 does not emit light. The derived shading correction coefficient is set as a new shading correction coefficient.

Then, the image reading unit 50 rotates to a position opposing the inversion conveyance path 33 that is provided on the original conveyance path 15. The conveyance rollers 39 convey the original G to the image reading unit 50, and the image reading unit 50 reads the image information of the first side of the original G. The read image information of the first side of the original G is stored in a RAM 1212 provided in the control unit 1200. Note that the white reference member 51 is disposed facing downward in the image forming apparatus 1, since consideration is given to the adhesion of dust and the like. Also, although the white reference member 51 is used as a reference member, the reference member may be other than white.

Figure 4:
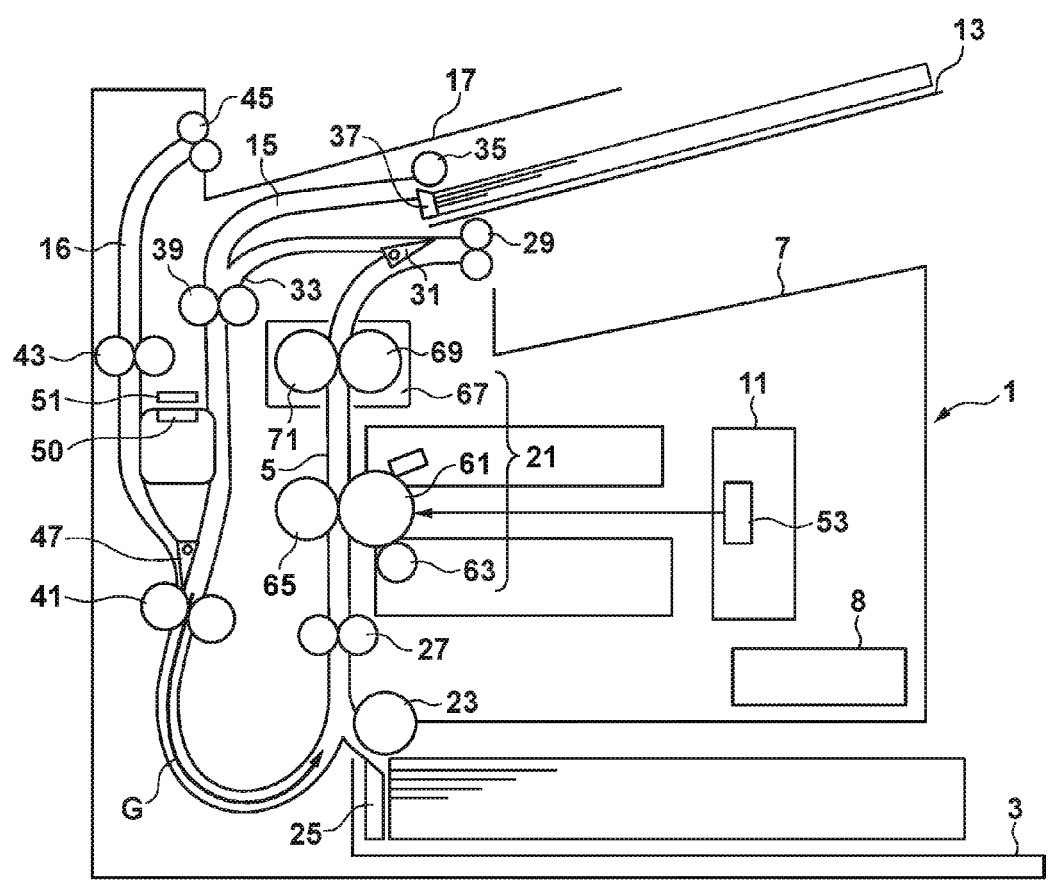
FIG. 4 is a diagram for illustrating an operation in which an original is conveyed from an inversion conveyance path to an original conveyance path according to one embodiment.

FIG. 4 shows reading of the image information of the first side of the original G ending, and the original G being conveyed from the inversion conveyance path 33 to the original conveyance path 16. Reading of the image information of the first side of the original G is started on the inversion conveyance path 33, and the original G, having passed the image reading unit 50, is conveyed by the conveyance rollers 41. The conveyance rollers 41 stop at the point at which the trailing edge of the original G has passed the switchback flapper 47. At this time, the original G is stationary in a state of being sandwiched by the conveyance rollers 41 until a predetermined time elapses. During this predetermined time period, the switchback flapper 47 switches the conveyance path from the inversion conveyance path 33 to the original conveyance path 16. After the predetermined time period has elapsed, the conveyance rollers 41 convey the original G to the original conveyance path 16.

Also, after reading of the image information of the first side of the original G has ended, the image reading unit 50 rotates to a position opposing the position where the white reference member 51 is installed. Here, the position opposing the white reference member 51 is on the rotational trajectory of the image reading unit 50. The shading correction coefficient is derived from a white reference image and a black reference image, at the position where the image reading unit 50 opposes the white reference member 51. The derived shading correction coefficient is set as a new shading correction coefficient.

Figure 5:
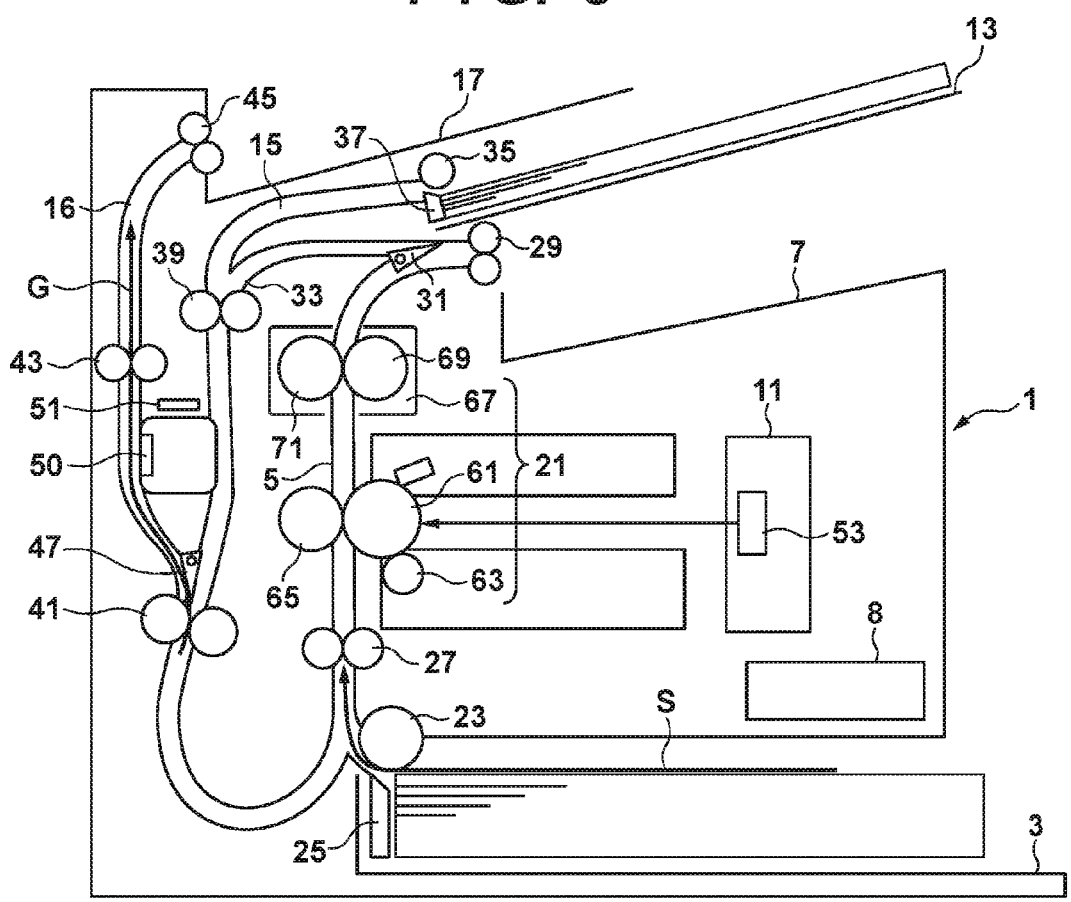
FIG. 5 is a diagram for illustrating an operation in which reading of image information of a second side of an original is started according to one embodiment.

FIG. 5 shows the original G being conveyed from the inversion conveyance path 33 to the original conveyance path 16, reading of the image information of the second side of the original G being started, and the recording material S being conveyed from the first sheet feeding unit 3 to the recording material conveyance path 5. The original G is stationary in a state of being sandwiched by the conveyance rollers 41 until a predetermined time elapses.

The image reading unit 50 rotates to a position opposing the original conveyance path 16, at the same time that the switchback flapper 47 switches the conveyance path of the original G from the inversion conveyance path 33 to the original conveyance path 16. Then, the conveyance rollers 41 start reverse rotation, and the original G is conveyed to the image reading unit 50 via the original conveyance path 16. When the original G passes the image reading unit 50, the image reading unit 50 reads the image information of the second side of the original G. The read image information of the second side of the original G is stored in the RAM 1212 provided in the control unit 1200.

Meanwhile, the recording material S that is housed in the first sheet feeding unit 3 is conveyed by the conveyance rollers 27 provided on the recording material conveyance path 5 one sheet at a time. At substantially the same time as the recording material S is conveyed, the light emitting unit 53 irradiates the surface of the photosensitive drum 61 with laser light based on the image information of the second side of the original G stored in the RAM 1212, and an electrostatic latent image is thereby formed on the surface of the photosensitive drum 61. The transfer unit 65 transfers the toner image formed by developing the electrostatic latent image using the toner to the recording material S, and the fixing unit 67 fixes the toner image to the recording material S to complete image formation based on the image information of the second side of the original G. In FIG. 5, conveyance of the recording material S is started together with the start of reading of the image information of the second side of the original G, but conveyance of the recording material S may be started after reading of the image information of the second side of the original G.

Figure 6:
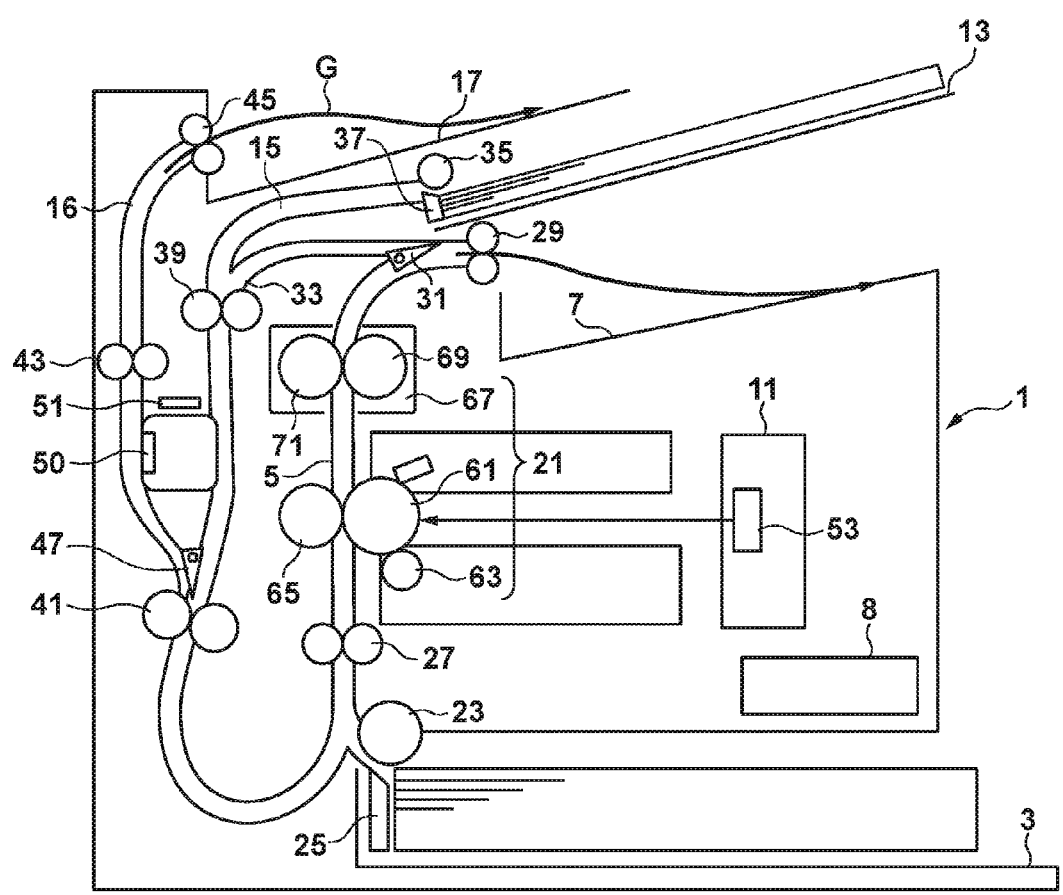
FIG. 6 is a diagram for illustrating an operation in which an original is discharged from an original conveyance path to a second sheet discharging unit according to one embodiment.

FIG. 6 shows reading of the image information of the second side of the original G ending, the original G being discharged from the original conveyance path 16 to the second sheet discharging unit 17, and the recording material S being conveyed from the recording material conveyance path 5 to the inversion conveyance path 33.

The original G from which the image information of the second side has been read on the original conveyance path 16 is discharged to the second sheet discharging unit 17 by the conveyance rollers 43 and the sheet discharging rollers 45. Once the trailing edge of the original G has passed the switchback flapper 47, the switchback flapper 47 switches the conveyance path from the original conveyance path 16 to the inversion conveyance path 33. Once image formation of the second side of the original G is completed, the recording material S is conveyed toward the inversion conveyance path 33 that has been switched to by the double-sided flapper 31, by the reverse rotation of the sheet discharging rollers 29.

Figure 7:
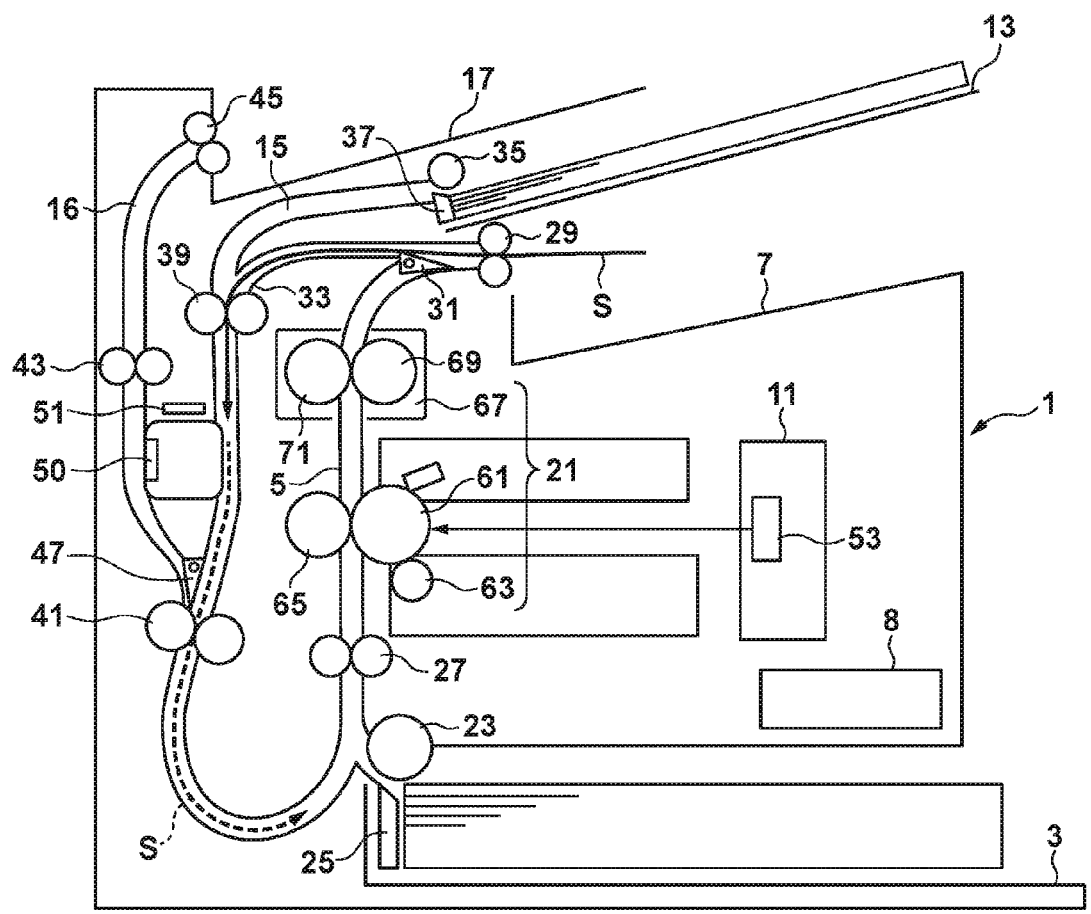
FIG. 7 is a diagram for illustrating image formation according to one embodiment.

FIG. 7 shows image formation to the first side of the recording material S. After the trailing edge of the recording material S on which image formation of the second side of the original G has been completed has passed the double-sided flapper 31, the double-sided flapper 31 switches the conveyance path from the recording material conveyance path 5 to the inversion conveyance path 33. Then, the sheet discharging rollers 29 start reverse rotation and convey the recording material S to the inversion conveyance path 33. The recording material S conveyed to the inversion conveyance path 33 passes the image reading unit 50 and is conveyed to the conveyance rollers 27 by the conveyance rollers 41, and further conveyed to the transfer unit 65 by the conveyance rollers 27.

In FIG. 7, the broken line arrow shows the conveyance of the recording material S. The light emitting unit 53 irradiates the surface of the photosensitive drum 61 with laser light based on the image information of the first side of the original G stored in the RAM 1212, and an electrostatic latent image is formed on the surface of the photosensitive drum 61. The transfer unit 65 transfers the toner image formed by developing the electrostatic latent image using toner to the recording material S, and the fixing unit 67 fixes the toner image to the recording material S to complete image formation based on the image information of the first side of the original G. Then, the recording material S is discharged to the first sheet discharging unit 7 by the sheet discharging rollers 29.

Figure 8:
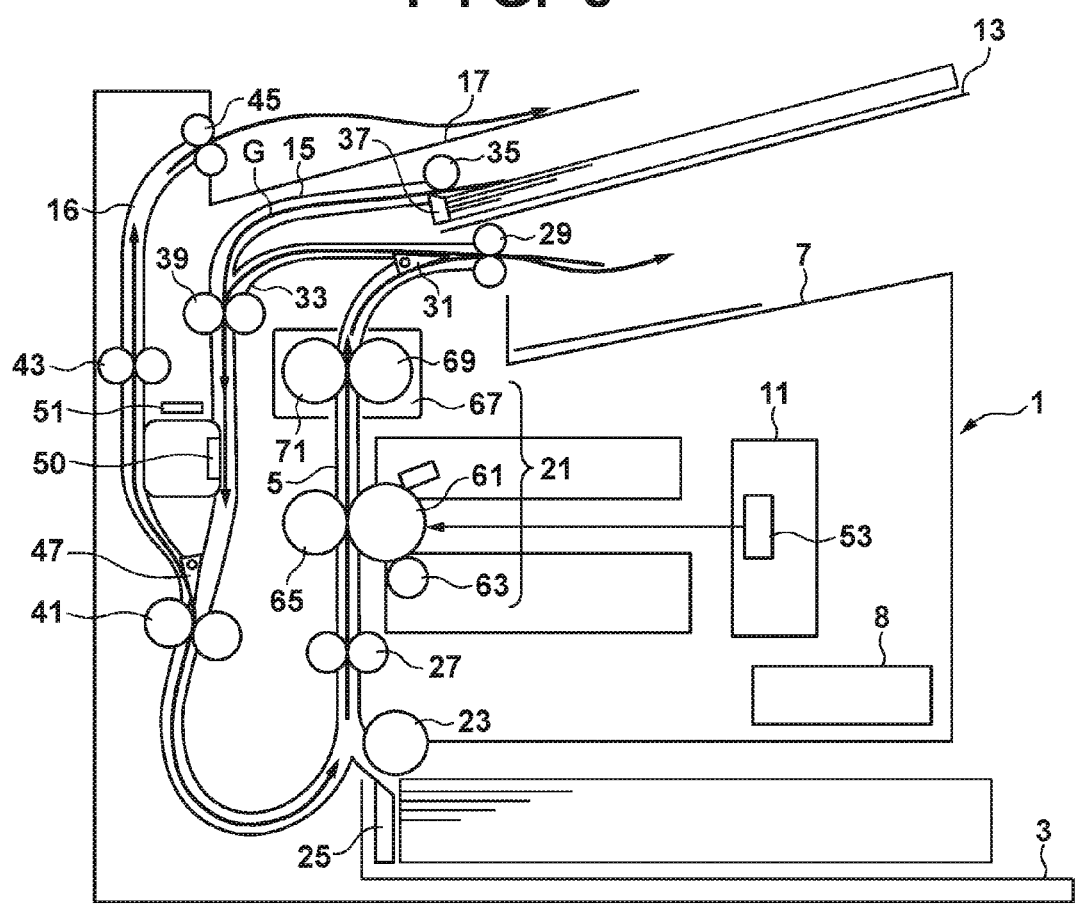
FIG. 8 is a diagram illustrating an operation of processing (additional print processing) for printing both sides of an original according to one embodiment.

FIG. 8 shows the image information of both the first side and the second side of the original G being read and additional print processing for performing image formation on both sides of the read original G.

First, the original G housed in the second sheet feeding unit 13 is conveyed to the conveyance rollers 39 one sheet at a time by the CIS pickup roller 35 and the separating unit 37. On the other hand, the image reading unit 50 derives a shading correction coefficient for correcting for variation in the output level of the image signals that originates in the CIS 1001 up until the start of reading of the first side of the original G fed from the second sheet feeding unit 13. Since the shading correction operation is similar to that described with FIG. 3, a detailed description is omitted.

The original G, having passed the image reading unit 50, is conveyed by the conveyance rollers 41. The conveyance rollers 41 stop at the point at which the trailing edge of the original G has passed the switchback flapper 47. Therefore, the original G is stationary in a state of being sandwiched by the conveyance rollers 41. After the predetermined time period has elapsed, the original G is conveyed to the original conveyance path 16.

The image reading unit 50 rotates to a position opposing the original conveyance path 16, at the same time that the switchback flapper 47 switches the conveyance path from the inversion conveyance path 33 to the original conveyance path 16. When the conveyance rollers 41 reverse rotate, the original G is conveyed along the original conveyance path 16 to the image reading unit 50. As a result of the original G being conveyed to and passing the image reading unit 50, the image reading unit 50 reads the image information of the second side of the original G. The image information of the second side of the read original G is stored in the RAM 1212. As a result of the control described above, reading of the image information of both sides of the original G is completed.

Additional printing is performed as a result of the following control on the original G on which reading of image information has ended. First, the original G is conveyed to the conveyance rollers 43 and the sheet discharging rollers 45. The sheet discharging rollers 45 stop at the point at which the trailing edge of the original G has passed the image reading unit 50. Therefore, the original G is stationary in a state of being sandwiched by the sheet discharging rollers 45. After a predetermined time period has elapsed, the sheet discharging rollers 45 reverse rotate. The original G is thereby conveyed along the original conveyance path 16 to the conveyance rollers 27 by the conveyance rollers 41. The conveyance rollers 27 conveys the original G to the transfer unit 65, so as to align the timing of the leading edge of the original G and the toner image on the surface of the photosensitive drum 61.

The toner image is transferred to the original G by the application bias and pressure that are imparted to the transfer unit 65 by the rotation of the photosensitive drum 61. Further, the original G is conveyed from the transfer unit 65 to the fixing unit 67. In the fixing unit 67, heat from the rotatable heating roller 69 and the pressure of the rotatable pressure roller 71 opposing the heating roller 69 fixes the toner image to the original G. The original G to which the toner image has been fixed is conveyed by the sheet discharging rollers 29. The sheet discharging rollers 29 stop at the point at which the trailing edge of the original G has passed the double-sided flapper 31, and the double-sided flapper 31 switches the conveyance path such that that the original G is conveyed in the direction of the conveyance rollers 39. When the sheet discharging rollers 29 reverse rotate after a predetermined time period has elapsed, the original G is conveyed by the conveyance rollers 39 in a state of being inverted from the first side to the second side. Subsequently, the original G is conveyed to the transfer unit 65 and the fixing unit 67 by the conveyance rollers 41 and the conveyance rollers 27, and the toner image is printed. Then, the original G is conveyed by the sheet discharging rollers 29, and the sheet discharging rollers 29 discharge the original G to the first sheet discharging unit 7. This enables the image information on both sides of the original G to be read, and additional printing to be performed on both sides of the original G that was the reading target, in accordance with the read image information.

Control Configuration

Next, an exemplary control configuration that controls the respective software of the image forming apparatus 1 will be described, with reference to FIG. 12. The control unit 1200 is connected to the printer control unit 1260 that prints an image on an original or the recording material S using the image reading unit 50 that read the image, the transfer unit 65, and the photosensitive drum 61. Also, the control unit 1200 is connected to a network 1230 or a public line 1280, and performs input/output of image information, device information and the like.

The image forming CPU 1211 is a processor that controls the entire image forming apparatus. The RAM 1212 is a system work memory for enabling the image forming CPU 1211 to operate, and is also an image memory for temporarily storing image data. Also, the RAM 1212 functions as a main memory of the image forming CPU 1211, a work area, and the like. The RAM 1212 stores setting information within images, job and operation logs of when various processing was performed, and the like. A ROM 1213 is a boot ROM in which a boot program of the system is stored. A HDD 1214 is a hard disk drive, and stores system software, applications, and image data. A control program for executing the flowchart of FIG. 14 which is discussed later may also be stored in this HDD 1214. Note that the steps of this flowchart are executed by the image forming CPU 1211. A processor other than the image forming CPU 1211 may, however, execute the steps of the flowchart of FIG. 14 discussed later, or the image forming CPU 1211 and another processor may execute the processing of the above flowchart cooperatively.

An operation unit I/F 1215 is an interface for controlling display on a display, key input from the display, hard key input and the like, and outputs image data to be displayed on the operation unit 805. Also, the operation unit I/F 1215 acts to convey information input from the operation unit 805 by a user of this system to the image forming CPU 1211. A network I/F 1216 connects to a network 1230, and inputs and outputs information. A modem 1217 connects to a public line, and inputs and outputs information. An SRAM 1218 is a volatile storage medium capable of high-speed operation. A RTC 1219 is a real-time clock, and is able to continue counting the current time even in a state where the control unit 1200 is not powered on. The above devices are provided on a system bus 1210.

An image bus I/F 1240 is a bus bridge that connects the system bus 1210 to an image bus 1250 that transfers image data at high speed, and converts the data structure. The image bus 1250 is constituted by a PCI bus or an IEEE 1394 bus. The following devices are disposed on the image bus 1250. A RIP unit 1251 is a raster image processor, and expands PDL data into a bitmap image. The device I/F 1252 connects the image reading unit 50 and the printer control unit 1260 to the control unit 1200, and performs conversion of image data between synchronous and asynchronous systems. A scanner image processing unit 1253 performs correction, processing and edit on input image data. A printer image processing unit 1254 performs printer correction, resolution conversion and the like on print output image data. An encryption unit 1255 performs encryption processing on input data including image data. A decryption processing unit 1256 performs decryption processing on encrypted data. The signal line 860 is a signal line that connects the image reading unit 50 and the printer control unit 1260 to the device I/F 1252.

Functional Configuration

Figure 13:
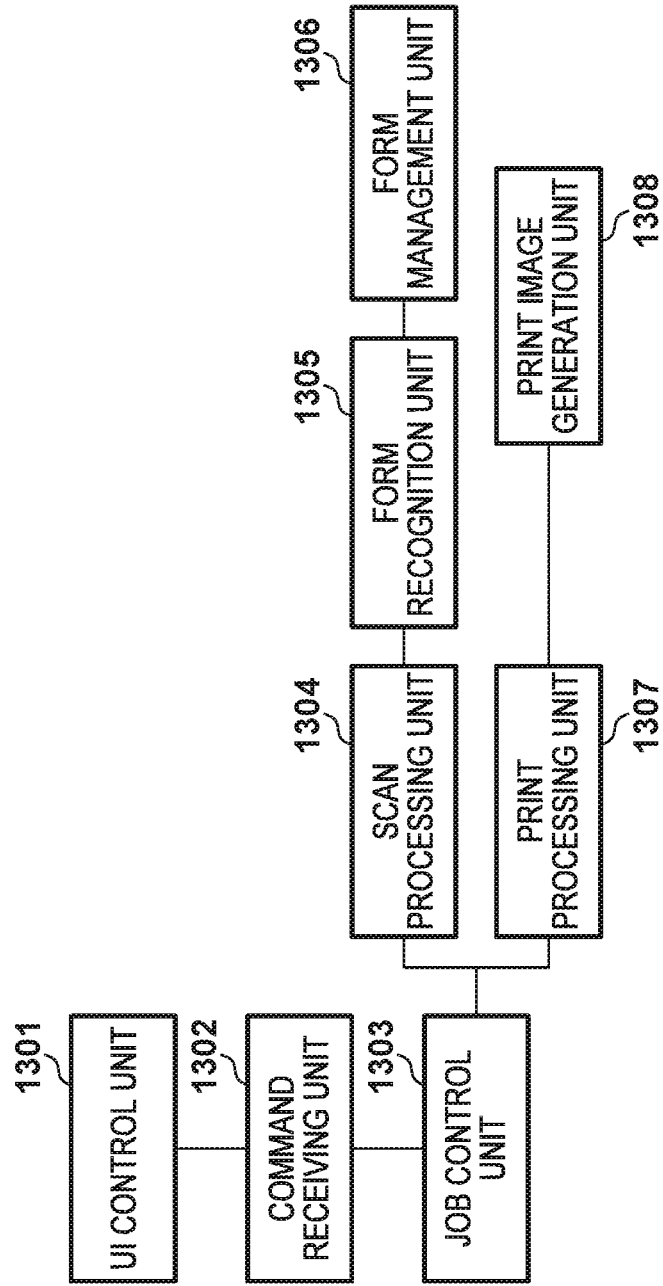
FIG. 13 is a diagram showing an example of a software configuration of a print system according to one embodiment.

Next, the functional configuration of an application form management system according to the present embodiment will be described, with reference to FIG. 13. The blocks in FIG. 13 represent the functions that are realized by executing software (programs) that is processed by the devices in FIGS. 9 and 12.

The image forming apparatus 1 is provided with a UI control unit 1301, a command receiving unit 1302, a job control unit 1303, a scan processing unit 1304, a form recognition unit 1305, a form management unit 1306, a print processing unit 1307, and a print image generation unit 1308 as a functional configuration. The image forming apparatus 1 analyzes commands received from the UI control unit 1301 for controlling a user interface, executes the analyzed information as a job, and prints or scans data.

Processing that is performed at the time of printing and scanning will be described in detail. Commands received from the UI control unit 1301 are received by the command receiving unit 1302 of the image forming apparatus 1. The received commands are then passed to the job control unit 1303. The job control unit 1303, having received a command, analyzes the command, generates a job that respective software in the image forming apparatus 1 can interpret, and performs overall control. The job control unit 1303 makes a processing request to the scan processing unit 1304 or the print processing unit 1307, based on the print/scan setting information of the command, and executes the print/scan job.

The scan processing unit 1304 receives the request from the job control unit 1303 and controls the devices to scan the original G. The generated scan image is then returned to the job control unit 1303 and the form recognition unit 1305. The form recognition unit 1305 performs form recognition using the data scanned by the scan processing unit 1304 and data managed by the form management unit 1306, and performs specification of printable locations on the original G and generation of additional print content. Here, form indicates the input format or the like of the original G, which is an application form or the like. The form management unit 1306 holds form information and print information associated with the form. In the present embodiment, printable locations, print data and written content discrimination area data are used as print information. A printable location is position information on the original G where print data can be printed. Print data indicates content to be formed at each printable location. Written content discrimination area data is position information on areas required in order to recognize content handwritten on the original G by the applicant.

The print processing unit 1307 converts a job received from the job control unit 1303 into image data, and controls the devices to print the image data on recording material or the original G. The print image generation unit 1308 generates a print image to be added to the original G from the print information specified by the form recognition unit 1305. In the present embodiment, the following description is given on the basis of the print image generation unit 1308 as an example of an image creation unit and the form recognition unit 1305 as an example of a specification unit.

Processing Procedure

Next, a processing procedure for performing overwrite printing on the original G, after the image forming apparatus 1 has read the original G and performed form recognition and print data generation will be described, with reference to FIG. 14. Note that, hereinafter, for ease of description, tasks performed by an applicant when requesting a bank transfer at a branch of a given institution, tasks performed by an operator, and the processing performed by the image forming apparatus 1 will be described using one flowchart. The agent of the steps (S) is clearly indicated in the description of the respective steps. Note that, here, FIGS. 15A to 15H will be referred to in describing the flowchart. FIGS. 15A to 15H show a bank transfer request form as an example of an application form that is described in the present embodiment. The bank transfer request form is an application form that is used at A Bank, and differs from those used at other banks. FIG. 15A shows a preprinted sheet that is provided in advance at the branch. The result shown in FIG. 15E or 15F can ultimately be obtained by performing various processing on the application form of FIG. 15A.

At step S1401, the applicant fills in a membership number 1501, a member name 1502, an application date 1503, and a financial institution type 1504 on the original G (FIG. 15A) provided at the branch. The applicant fills in the application form manually. The application form after being filled in is shown in FIG. 15B.

At step S1402, the operator sets the original G (FIG. 15B) in the second sheet feeding unit 13 of the image forming apparatus 1, and gives a scan instruction to the image forming apparatus 1 using the operation unit 805. Here, in the image forming apparatus 1, the scan instruction given via the operation unit 805 is received by the command receiving unit 1302.

Upon a command of the scan instruction being received, scan processing is started by an instruction from the job control unit 1303. Specifically, at step S1403, the scan processing unit 1304 scans the original G (FIG. 15B) placed in the second sheet feeding unit 13 of the image forming apparatus 1, in accordance with an instruction from the job control unit 1303. Further, the form recognition unit 1305 recognizes the form of the data scanned at step S1403, using the forms managed by the form management unit 1306, and obtains a form ID, a membership number, and a member name.

Figure 16A:
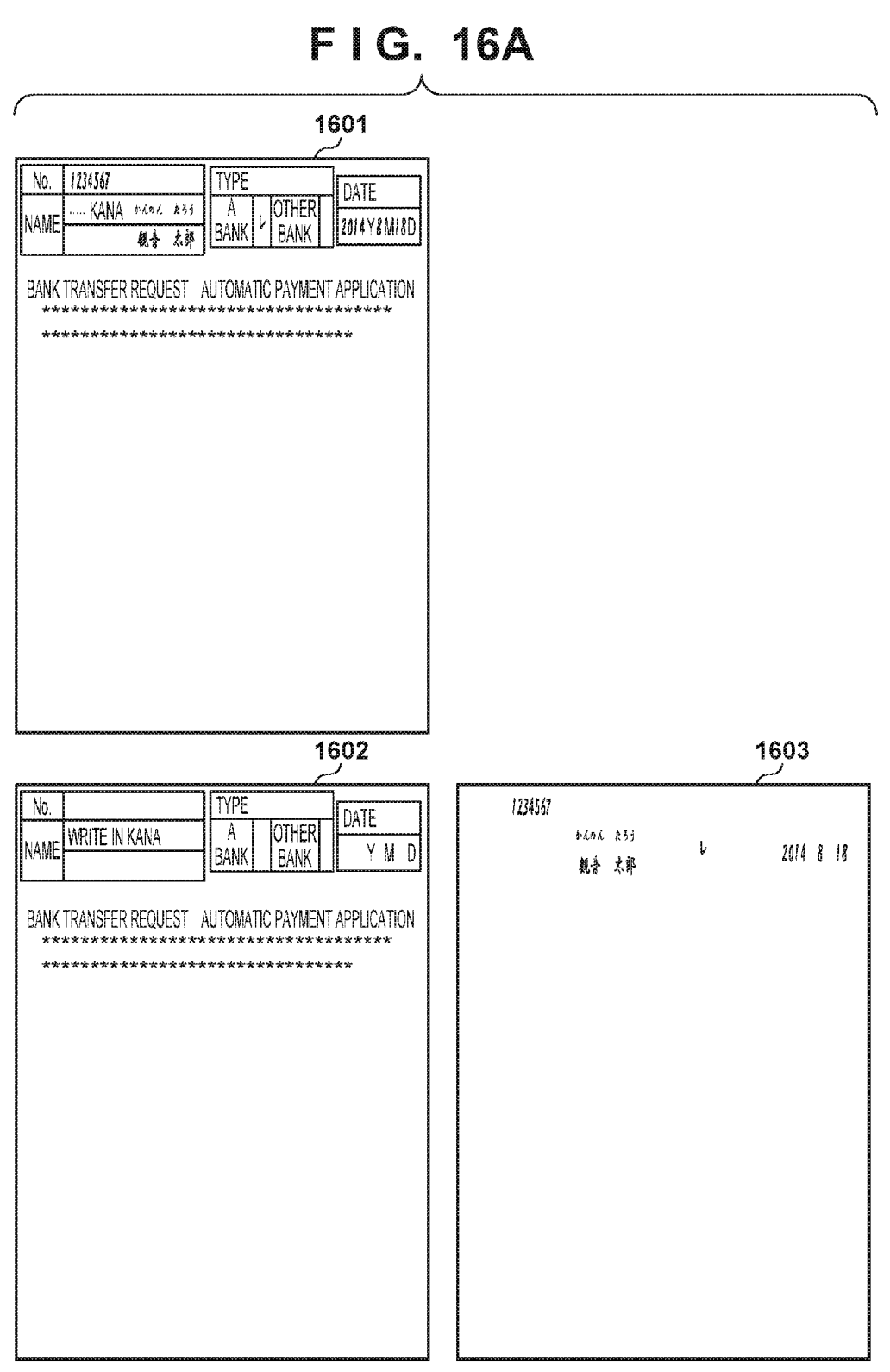

Here, the operations of the form recognition unit 1305 will be described, with reference to FIGS. 16A and 16B. In the present embodiment, form recognition is performed by an image operation called template matching. Reference numeral 1601 in FIG. 16A is the data of the original G that is obtained by the scan processing unit 1304 after the applicant has filled in the application form, and the content of the original G are comparable to FIG. 15B. A template 1602 shown in FIG. 16A and a template 1604 shown in FIG. 16B are exemplary templates for recognizing the form.

The form recognition unit 1305 calculates the difference between the obtained original data and the templates. An operation result 1603 in FIG. 16A is the difference data of the original data 1601 and the template 1602, and an operation result 1605 in FIG. 16B is the difference data of the original data 1601 and the template 1604. The operation results are calculated such that in the case of a dot (pixel) that exists in the same position in the original and the template, the dot does not appear in the operation result, and in the case of a dot that only exists in either the original and the template, the dot appears in the operation result. Note that, here, a dot corresponds to one pixel of an image. If there is a dot, this indicates that the pixel is formed, and if there is not a dot, this indicates that the pixel is not formed. That is, the operation referred to here involves comparing the density levels of dots (pixels) of the image that are formed on the original with the corresponding dots of the template, and specifying dots with respect to which the density levels differ by a predetermined threshold or more as dots with difference. Note that although the case where the image is monochrome is given as an example in the present embodiment, the above difference method can easily be applied to a color image.

Finally, the form recognition unit 1305 calculates the total number of dots that exist in the operation result. In this example, the dot total of the operation result 1603 is 242 dots, and the dot total of the operation result 1605 is 27712 dots. Since the operation result with the least difference data is the desired form, in this example, the original is recognized as being the same as the operation result 1603, that is, the template 1602. The above operation is a similarity recognition method called SAD (Sum of Absolute Differences), and the equation thereof is shown by equation 1.

$$SAD = \sum_{x=0}^{X-1} \sum_{y=0}^{Y-1} |I(x, y) - T(x, y)| \qquad \text{Equation 1}$$

Here, I(x, y) indicates the luminance value of the original. T(x, y) shows the luminance value of the template. Here, even though SAD was used in calculating the similarity, other similarity recognition methods such as SSD (Sum of Squared Differences) may be used.

Figure 14:
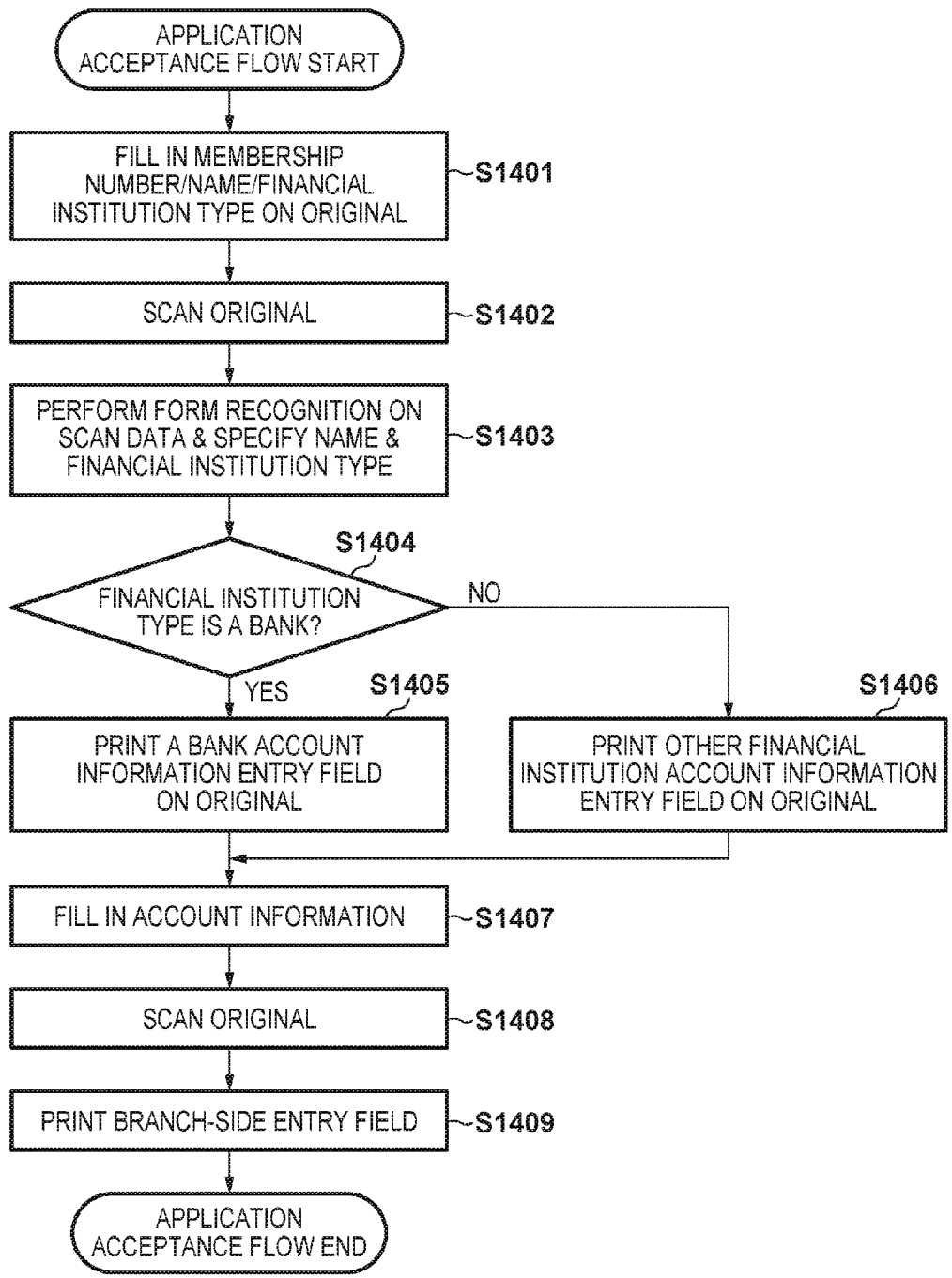
FIG. 14 is a flowchart showing print processing on an original according to one embodiment.
Figure 15H:
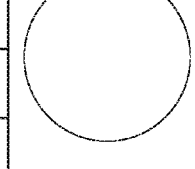

Returning to the description of FIG. 14, in step S1403, the form recognition unit 1305 further recognizes at the same time which of the check boxes of two financial institution types is checked. The recognition method referred to here involves obtaining the area of the "A Bank" payment type and the area of the "Other Bank" payment type, for example, from the form management unit 1306, and judging that the area with the most black dots of the two areas is the type that is checked. Note that in the case where it is judged that both areas are checked or that neither of the areas is checked, control for error display may be performed.

At step S1404, the form recognition unit 1305 specifies whether the type of financial institution that is checked is A Bank. Based on the specification result, the processing advances to step S1405 if A Bank is checked, and advances to step S1406 if this is not the case.

At step S1405, since the type of the financial institution that is checked is A Bank, the print image generation unit 1308 generates an account information entry field 1505 for A Bank and stores the generated entry field in the RAM 1212. Then, at step S1405, the print processing unit 1307 prints the print data generated at step S1404 on the original G, and advances to step S1407. The printed output result is shown in FIG. 15C. As shown in FIG. 15C, entry fields for account name and designated account have been newly printed. Thus, the entry fields that are printed at one time are desirably only entry fields for prompting the user to fill in items related to one piece of information (here, account). This control enables the content written on the application form to be readily grasped even by an elderly person. It is, of course, also possible to print plural pieces of information depending on the settings.

At step S1407, the applicant fills in personal account information 1506 in the account information entry field 1505 added to the original G. The result of the applicant having filled in this information is shown in FIG. 15D. Next, at step S1408, the operator sets the original G (FIG. 15D) in the second sheet feeding unit 13 of the image forming apparatus 1, and gives a scan instruction to the image forming apparatus 1 using the operation unit 805. Here, in the image forming apparatus 1, the scan instruction given via the operation unit 805 is received by the command receiving unit 1302.

Upon receiving the command of the scan instruction, scan processing is started by an instruction from the job control unit 1303. Specifically, at step S1408, the scan processing unit 1304 scans the original G (FIG. 15D) placed in the second sheet feeding unit 13 of the image forming apparatus 1, in accordance with an instruction from the job control unit 1303.

At step S1409, the form recognition unit 1305 recognizes the form of the data scanned using the forms managed by the form management unit 1306, and obtains that account information was filled in. Further, the print image generation unit 1308 generates data of a branch-side entry field 1507. Then, the print processing unit 1307 prints the generated print data on the original G, similarly to step S1405. The printing result is shown in FIG. 15E. As shown in FIG. 15E, it is evident that the branch-side entry field 1507 has been additionally printed. The completed original G (FIG. 15E) in which all information has been filled in can thereby be obtained from the original G (FIG. 15A) on which the minimum required information is preprinted.

On the other hand, in the case where, at step S1404, the form recognition unit 1305 judges that the area of the "Other Bank" payment type is checked, the processing advances to step S1406, and the print image generation unit 1308 generates an account information entry field 1508 of that bank. Then, at step S1406, the print processing unit 1307 prints the generated print data. The printing result is shown in FIG. 15F.

Next, at step S1407, the applicant fills in personal account information 1509 in the account information entry field 1508 added to the original G. The result of having filled in this information is shown in FIG. 15G. Further, at step S1408, the operator sets the original G (FIG. 15G) in the second sheet feeding unit 13 of the image forming apparatus 1, and given a scan instruction to the image forming apparatus 1 using the operation unit 805. Here, in the image forming apparatus 1, the scan instruction given via the operation unit 805 is received by the command receiving unit 1302.

Upon receiving the command of the scan instruction, scan processing is started by an instruction from the job control unit 1303. Specifically, at step S1408, the scan processing unit 1304 scans the original G (FIG. 15G) placed in the second sheet feeding unit 13 of the image forming apparatus 1, in accordance with an instruction from the job control unit 1303.

At step S1409, the form recognition unit 1305 recognizes the form of the data scanned using the forms managed by the form management unit 1306, and obtains that account information was filled in. Further, the print image generation unit 1308 generates data of a branch-side entry field 1510. Then, the print processing unit 1307 prints the generated print data on the original G, similarly to step S1405. The printing result is shown in FIG. 15H. The completed original G (FIG. 15H) in which all information has been filled in can thereby be obtained from the original G (FIG. 15A) on which the minimum required information is preprinted.

Note that although the present embodiment has been described here in terms of operations performed by an applicant and an operator as an example, the present invention is not limited thereto. It is not necessary for printing to be performed through the operations of more than one person, and printing can also be performed through the operations of one person. Also, although the present embodiment was described using an account application form as an example here, the present invention is not limited thereto. Even with printed material of any content, it is possible to analyze an image that is formed with a similar method and to overwrite appropriate additional images according to that image.

As described above, the present embodiment enables processing to be performed quickly when filling in an application form or the like without confusing the contents to be filled in, by printing an entry field required at that time. Specifically, the required entry field is printed, and upon the application form in which this location has been filled in being scanned, an additional entry field is further printed and the applicant is prompted to fill in this entry field. Thus, according to the instant invention, entry fields are printed in predetermined units, and once it can be confirmed that these entry fields have been filled in, the following entry fields are printed. An application form in which all items have been filled in can be created by repeating such processing as many times as necessary. Also, filling in the same information such as the name of the financial institution or the financial institution code in different formats is not necessary. Here, the present embodiment was described using an electrophotographic image forming apparatus as the image forming apparatus. However, the present invention is not limited to an electrophotographic image forming apparatus, and can also be applied to other image forming apparatuses such as an inkjet image forming apparatus.

Second Embodiment

Hereinafter, a second embodiment of the present invention will be described. In the present embodiment, a two-dimensional barcode is printed on the original G in advance, and a description is added about control for specifying the form using this two-dimensional barcode. Note that, in the present embodiment, the same reference signs are given to configuration that is the same as the first embodiment, and description thereof is omitted. FIG. 17 shows an example of the original G on which is printed a two-dimensional barcode 1701 according to the present embodiment. As shown in FIG. 17, the two-dimensional barcode 1701 has been added to the application form (original G) of FIG. 15A.

In the case where a two-dimensional barcode 1701 is found in the data scanned by the scan processing unit 1304, the form recognition unit 1305 decodes the code, and obtains embedded information, which is a form ID, here. In the present embodiment, form IDs are used, in addition to the printable locations, print data and written content discrimination area data described in the first embodiment as print information. Form IDs are IDs individually allocated to each of a plurality of different forms, and use of the form IDs enables the form of scanned data to be readily discriminated. The form recognition unit 1305, using this form ID, obtains corresponding printable locations, print data and written content discrimination area data from the form management unit 1306, and notifies the obtained information to the print image generation unit 1308. Since the processing performed after the print image to be added to the original has been generated from the specified print information by the print image generation unit 1308 is similar to the first embodiment, description thereof is omitted here.

Generally, the processing for determining the form by template matching described in the first embodiment requires a certain amount of processing time. That method involves calculating the similarity of a template with the image of the portion that coincides with the template while changing through various templates, and calculating the similarities requires a huge amount of calculation. However, since a two-dimensional barcode is a code dedicated to information reading, the amount of calculation needed in order to obtain required information can be suppressed, and high-speed processing is possible.

As described above, according to the present embodiment, the speed of processing for specifying the form of the original can be increased by including a code required in order to determine the form in the printed original in advance. That is, the processing load of the form recognition processing that is performed at step S1403 in FIG. 14 can be reduced. Note that a configuration may be adopted in which printing of a two-dimensional barcode such as described above is performed in printing that is equivalent to FIG. 15C in the case where subsequent print content changes depending on the written content. Also, although, in the present embodiment, a two-dimensional barcode was given as an example of information indicating the form, the present invention is not limited thereto, and information in another format may be printed.

Third Embodiment

Hereinafter, a third embodiment of the present invention will be described. In the present embodiment, description is added about control for performing character recognition on information handwritten on the original G, and changing the content to be added to the original G depending on the content thereof. Note that, in the present embodiment, the same reference signs are given to configuration that is the same as the first embodiment, and description thereof is omitted. The original G according to the present embodiment is shown in FIGS. 18A to 18C. The original shown in FIG. 18A corresponds to the original shown in FIG. 15C in the first embodiment, and on comparison with FIG. 15C, entry fields for the name of the financial institution and the branch name exists instead of the entry fields of a financial institution code and a branch code, as shown by reference numeral 1801. Although the processing procedure in the present embodiment is basically the same as the flowchart of FIG. 14, in step S1408 according to the present embodiment, processing that is performed by the form recognition unit 1305 is further added. Hereinafter, description will focus on this additional processing.

Figure 19:
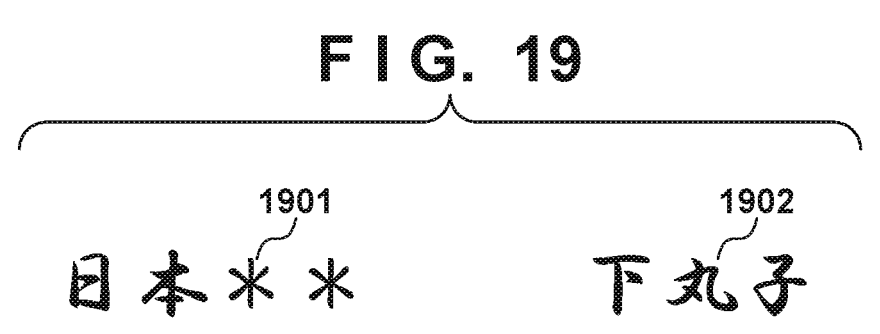

The form recognition unit 1305 scans the original shown in FIG. 18B that has been filled in by the applicant, specifies the areas where the bank name and the branch name are indicated using the area information that is managed by the form management unit 1306, and clips the images contained in those areas. The clipped images are shown in FIG. 19. The reference numeral 1901 is the clipped image of the bank name that was filled in, and reference numeral 1902 is the clipped image of the branch name that was filled in.

Next, the form recognition unit 1305 recognizes the contents handwritten by the applicant from the clipped images using optical character recognition technology. According to the example in the present embodiment, the contents is confirmed to be "Japan ** Bank, Shimomaruko Branch". Since the aforementioned financial institution code and branch code are fields for filling in standardized financial institution codes, these codes will be naturally determined once the bank name and the branch name are determined. It is assumed that these codes are a financial institution code 1234 and a branch code 567.

Once the financial institution code and the branch code are determined, the print image generation unit 1308, at step S1408, generates financial institution code and branch code field data. At step S1409, the print processing unit 1307 prints financial institution code and branch code fields 1804 together with the branch-side entry field data. The printing result is shown in FIG. 18C.

As described above, according to the present embodiment, the financial institution code and branch code required for a bank transfer request form can be generated by recognizing the bank name and branch name that the applicant has written by hand, and the contents to be filled in can be further reduced. In other words, according to the present embodiment, the contents to be subsequently printed can be changed in accordance with the contents filled in by the applicant.

Other Embodiments

In the above embodiments, an image forming apparatus that forms a monochrome image was described as an example, but the present invention is not limited thereto. It is possible to perform image formation using the method described in the above embodiments, even with an image forming apparatus that forms a color image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-045087 filed on Mar. 6, 2015, which is hereby incorporated by reference herein in its entirety.

What is claimed is:

1. An image forming apparatus comprising:
an image forming device configured to form an image;
a reader configured to read an original on which a first image is formed;
a conveyer configured to convey the original to the reader, and then convey the original to the image forming device;
a memory that stores a set of instructions; and
at least one processor that executes the instructions to:
specify information relating to the first image formed on the original, based on a reading result read by the reader; and
determine a second image, based on the information relating to the specified first image, the second image being determined in accordance with a form in the first image,
wherein the at least one processor further executes the instructions to cause the image forming device to overwrite the second image (i) in a case where the second image is of a second form and the first image is of a first form and (ii) in a case where the second image is of a fourth form, different from the second form, and the first image is of a third form different from the first form.

2. The image forming apparatus according to claim 1, wherein the at least one processor further executes the instructions to specify a form in the original as the information relating to the specified first image.

3. The image forming apparatus according to claim 1, wherein the memory further stores templates of a plurality of forms, and
the at least one processor further executes the instructions to specify a template having a highest similarity among the plurality of templates as a form in the original.

4. The image forming apparatus according to claim 3, wherein the at least one processor further executes the instructions to obtain a difference between the first image read by the reader and an image of the template as the similarity, and
judge a template with an obtained least difference to be the template having the highest similarity.

5. The image forming apparatus according to claim 4, wherein the at least one processor further executes the instructions to compare a density level of pixels of the first image that are formed on the original with a density level of corresponding pixels of the template, specify a pixel with a density level greater than or equal to a predetermined threshold as a pixel with a difference, and judge a template having a least number of pixels with the difference to be the template having the least difference.

6. The image forming apparatus according to claim 1, wherein the at least one processor further executes the instructions to specify whether there is an image in a predetermined area of the original from the first image read by the reader, and
determine the second image, based on a specified form, and whether an image is specified in the predetermined area of the original.

7. The image forming apparatus according to claim 1, wherein the at least one processor further executes the instructions to specify a form and a character from the first image read by the reader, and
determine the second image, based on the specified form and the specified character.

8. The image forming apparatus according to claim 1, wherein the first image is an image written on the original by a user.

9. The image forming apparatus according to claim 1, wherein form information indicating a form in the original is formed on the original, and
the at least one processor further executes the instructions to obtain the form information from the first image read by the reader, and specify the form in the original based on the obtained form information.

10. The image forming apparatus according to claim 9, wherein the form information is formed with a two-dimensional barcode.

11. The image forming apparatus according to claim 1, wherein the original is completed by the reading of the reader, and the at least one processor repeatedly executes the instructions.

12. The image forming apparatus according to claim 11, wherein the original is an application form to a predetermined institution.

13. The image forming apparatus according to claim 12, wherein the second image that is formed at one time by the image forming device is an entry field for filling in an item related to one piece of information on the application form.

14. An image forming apparatus comprising:
a reader configured to read an original on which a first image is formed; and an image forming device configured to form an image on the original;

a memory that stores a set of instructions; and at least one processor that executes the instructions, wherein information relating to the first image formed on the original is specified based on a reading result read by the reader, and a second image is determined based on the information relating to the first image, the second image being determined in accordance with a form in the first image, and the at least one processor executes the instructions to cause the image forming device to overwrite the second image (i) in a case where the second image is of a second form and the first image is of a first form and (ii) in a case where the second image is of a fourth form, different from the second form, and the first image is of a third form, different from the first form.

15. The image forming apparatus according to claim 14, wherein a form in the original is specified as the information relating to the first image.

16. The image forming apparatus according to claim 14, wherein a template having a highest similarity among templates of a plurality of forms is specified as the form in the original.

17. An image forming system including an image forming apparatus that performs image formation, comprising:

an image forming device configured to form an image;

a reader configured to read an original on which a first image is formed;

a memory that stores a set of instructions; and at least one processor that executes the instructions to:

specify information relating to the first image formed on the original, based on a reading result read by the reader; and determine a second image, based on the information relating to the specified first image, the second image being determined in accordance with a form in the first image, wherein the at least one processor further executes the instructions to cause the image forming device to overwrite the second image (i) in a case where the second image is of a second form and the first image is of a first form and (ii) in a case where the second image is of a fourth form, different from the second form, and the first image is of a third form, different from the first form.

* * * * *